(12) United States Patent
Hao

(10) Patent No.: US 10,789,834 B2
(45) Date of Patent: Sep. 29, 2020

(54) TRAFFIC DATA DISTRIBUTION IN A NAVIGATIONAL SYSTEM

(75) Inventor: Jack Jianxiu Hao, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2336 days.

(21) Appl. No.: 12/625,216

(22) Filed: Nov. 24, 2009

(65) Prior Publication Data

US 2011/0125583 A1    May 26, 2011

(51) Int. Cl.
| | | |
|---|---|---|
| *G01C 21/36* | (2006.01) | |
| *G08G 1/00* | (2006.01) | |
| *G06Q 30/00* | (2012.01) | |
| *G08G 1/01* | (2006.01) | |
| *G08G 1/0967* | (2006.01) | |
| *G01C 21/34* | (2006.01) | |
| *G06Q 30/02* | (2012.01) | |

(52) U.S. Cl.
CPC .......... *G08G 1/01* (2013.01); *G01C 21/3492* (2013.01); *G06Q 30/0267* (2013.01); *G08G 1/096716* (2013.01); *G08G 1/096758* (2013.01); *G08G 1/096775* (2013.01)

(58) Field of Classification Search
USPC ...................................................... 705/14.1
See application file for complete search history.

(56) References Cited

U.S. PATENT DOCUMENTS

| | | | | |
|---|---|---|---|---|
| 5,832,406 A | * | 11/1998 | Iwami ................... | G01C 21/36 701/428 |
| 2001/0029425 A1 | * | 10/2001 | Myr .................... | G01C 21/3492 701/117 |
| 2004/0019592 A1 | * | 1/2004 | Crabtree ............. | G06F 16/2246 |
| 2004/0068364 A1 | * | 4/2004 | Zhao .................. | G01C 21/3492 701/468 |

(Continued)

FOREIGN PATENT DOCUMENTS

EP          0967055 A2 *  12/1999  ............. B25J 9/161

OTHER PUBLICATIONS

A. Touir; ML-Quadtree: The Design of an Efficient Access Method for Spatial Database Systems; Jan. 2004; Journal of King Saud University, Comp and Info Science, vol. 17, 2004, pp. 43-60, (A.H. 1425/2004).*

(Continued)

*Primary Examiner* — Arthur Duran

(57) ABSTRACT

A server identifies areas of traffic congestion and generates traffic objects associated with the identified areas of traffic congestion. The server receives, from a mobile device, a request for traffic objects, where the request includes a current geographic location of the mobile device and a destination geographic location to which the mobile device plans to travel. The server determines a length of travel based on the current geographic location and the destination geographic location, identifies a particular traffic object based on the length of travel, the current geographic location, and the destination geographic location, and provides (Continued)

information regarding the particular traffic object to the mobile device to permit the mobile device to generate navigational directions based on the particular traffic object.

23 Claims, 18 Drawing Sheets

(56) References Cited

U.S. PATENT DOCUMENTS

| | | | | |
|---|---|---|---|---|
| 2005/0174351 | A1* | 8/2005 | Chang | G06T 11/206 |
| | | | | 345/440 |
| 2006/0149461 | A1* | 7/2006 | Rowley | G08G 1/096811 |
| | | | | 701/423 |
| 2007/0155360 | A1* | 7/2007 | An | G08G 1/01 |
| | | | | 455/403 |
| 2007/0208498 | A1* | 9/2007 | Barker | G08G 1/0104 |
| | | | | 701/117 |
| 2007/0225912 | A1* | 9/2007 | Grush | G01C 21/20 |
| | | | | 701/469 |
| 2008/0045234 | A1* | 2/2008 | Reed | H04W 4/029 |
| | | | | 455/456.1 |
| 2008/0071465 | A1* | 3/2008 | Chapman | G01C 21/3691 |
| | | | | 701/117 |
| 2008/0154876 | A1* | 6/2008 | Hao | G06F 16/9537 |
| 2008/0248815 | A1* | 10/2008 | Busch | G06Q 30/0233 |
| | | | | 455/456.5 |
| 2009/0157566 | A1* | 6/2009 | Grush | G01C 21/28 |
| | | | | 705/400 |
| 2010/0174479 | A1* | 7/2010 | Golding | G01C 21/3484 |
| | | | | 706/14 |
| 2010/0198501 | A1* | 8/2010 | Otani | G01C 21/3632 |
| | | | | 701/533 |
| 2011/0087425 | A1* | 4/2011 | Deng | G01C 21/32 |
| | | | | 701/532 |
| 2011/0125392 | A1* | 5/2011 | Hao | G08G 1/0104 |
| | | | | 701/118 |
| 2014/0136107 | A1* | 5/2014 | Pfeifle | G01C 21/34 |
| | | | | 701/533 |
| 2015/0160023 | A1* | 6/2015 | Goel | G08G 1/0112 |
| | | | | 701/400 |

OTHER PUBLICATIONS

Fuan Tsai, Adaptive Level of Detail for Large Terrain Visualization, 2008, The International Archives of the Photogrammetry, Remote Sensing and Spatial Information Science, vol. XXXVII, Part B4, Beijing 2008, pp. 579-584.*

Peter Sanders and Sominik Schultes, Engineering Fast Route Planning Algorithms, Mar. 27, 2007, University Karlsrube Germany, pp. 23-36.*

"Shortest path problem", Wikipedia, the free encyclopedia http://en.wikipedia.org/wiki/Shortest_path_problem , 3 pages, Nov. 2, 2009.

"Dijkstara's algorithm", Wikipedia, the free encyclopedia http://en.wikipedia.org/wiki/Dijkstra%27s_algorithm , 4 pages, Nov. 9, 2009.

"Bellman-Ford algorithm", Wikipedia, the free encyclopedia http://en.wikipedia.org/wiki/Belman-Ford_algorithm , 3 pages, Oct. 31, 2009.

* cited by examiner

| 1100 | NODE ID | NODE LOCATION | NODE NAME | LINKS | LAYER |
|---|---|---|---|---|---|
| | 1110 | 1120 | 1130 | 1140 | 1150 |
| | ... | | | | |

Fig. 11

| 1200 | LINK ID | END NODES | LINK NAME | SPEED | TYPE OF LINK | LAYER |
|---|---|---|---|---|---|---|
| | 1210 | 1220 | 1230 | 1240 | 1250 | 1260 |
| | ... | | | | | |

Fig. 12

TRAFFIC DATA DISTRIBUTION IN A NAVIGATIONAL SYSTEM

BACKGROUND

Some mobile communication devices include navigation applications that display a map showing the location of a user of the mobile communication device in order to aid the user with navigation (e.g., when driving around an unknown location). Many navigation applications permit the user to input information, such as a starting point, a destination point, how a path between the starting and destination points should be calculated (e.g., shortest distance, shortest time, most use of highways, etc.), etc. A navigation application utilizes this information to calculate turn-by-turn instructions for traveling from the starting point to the destination point.

BRIEF DESCRIPTION OF THE DRAWINGS

FIG. 11 is a diagram of an exemplary data structure that may store node data;

FIG. 12 is a diagram of an exemplary data structure that may store link data;

DETAILED DESCRIPTION OF PREFERRED EMBODIMENTS

The following detailed description refers to the accompanying drawings. The same reference numbers in different drawings may identify the same or similar elements.

Implementations, described herein, may collect real-time geographic location and traveling speed data from various mobile devices, use the collected data to generate traffic data regarding locations of traffic congestion, and provide relevant portions of the traffic data to a mobile device to assist the mobile device in calculating navigational directions. As a result, a user, of the mobile device, may become aware of and avoid areas of traffic congestion.

Figure 1:
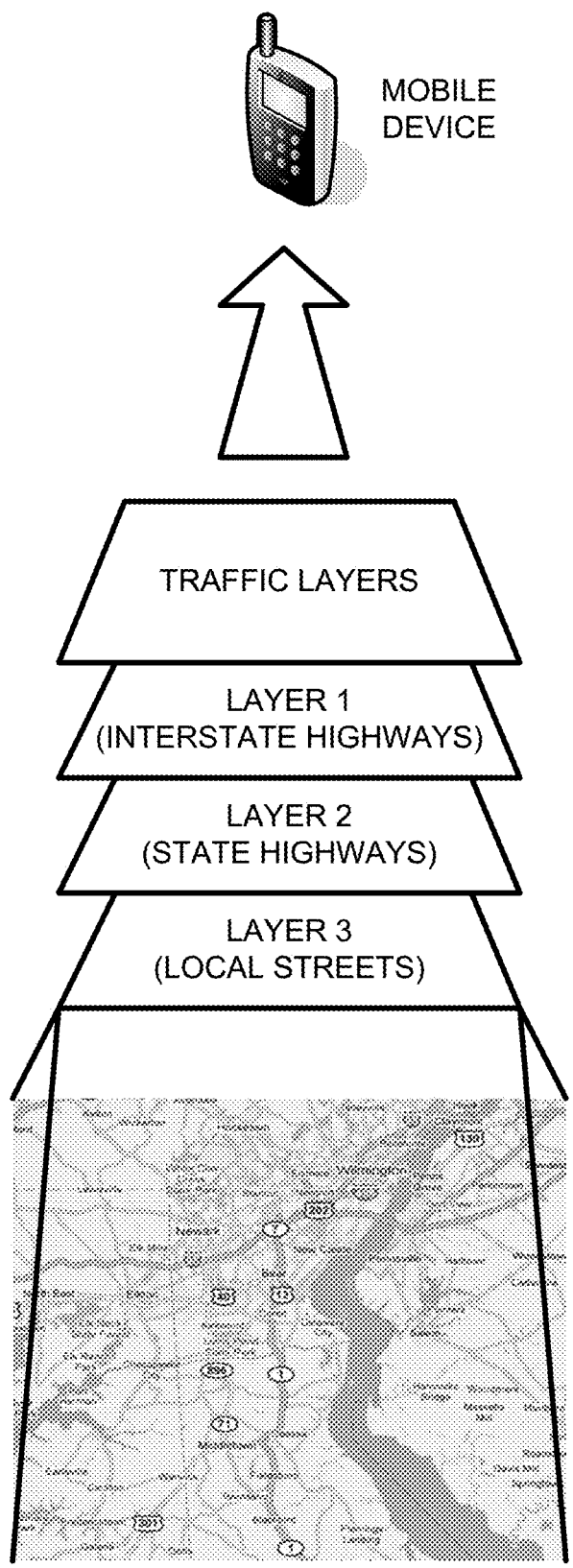
FIG. 1 is a diagram of an overview of an implementation described herein.

FIG. 1 is a diagram of an overview of an implementation described herein. As shown in FIG. 1, map data, of a road network, may be separated into different map layers, such as an interstate highway layer (shown as layer 1), a state highway layer (shown as layer 2), and a local street layer (shown as layer 3). The interstate highway layer may include, for example, information regarding roadways that traverse multiple states (or regions). The state highway layer may include, for example, information regarding roadways that are included within a single state (or region). The local street layer may include, for example, information regarding roadways local to a particular locale (e.g., a town or a city).

One or more traffic layers may also be formed. Each of the traffic layers may correspond to one of the map layers and include a subset of the map layer. For example, a traffic layer may include information regarding roadways, of the corresponding map layer, that include traffic congestion. In one implementation, described herein, a traffic server may provide traffic data, associated with a relevant traffic layer, to a mobile device so that the mobile device may use the traffic data to calculate navigational directions. The relevant traffic layer may be determined, for example, based on information regarding the current geographic location of the mobile device and the destination location for which navigational directions have been requested. The mobile device may use the traffic data, of the relevant traffic layer, to calculate navigational directions.

By communicating the traffic data, of just the relevant traffic layer, the amount of communications between the traffic server and the mobile device can be minimized. The mobile device can use this traffic data to quickly compute the best navigational directions and avoid traffic congestion.

Figure 2:
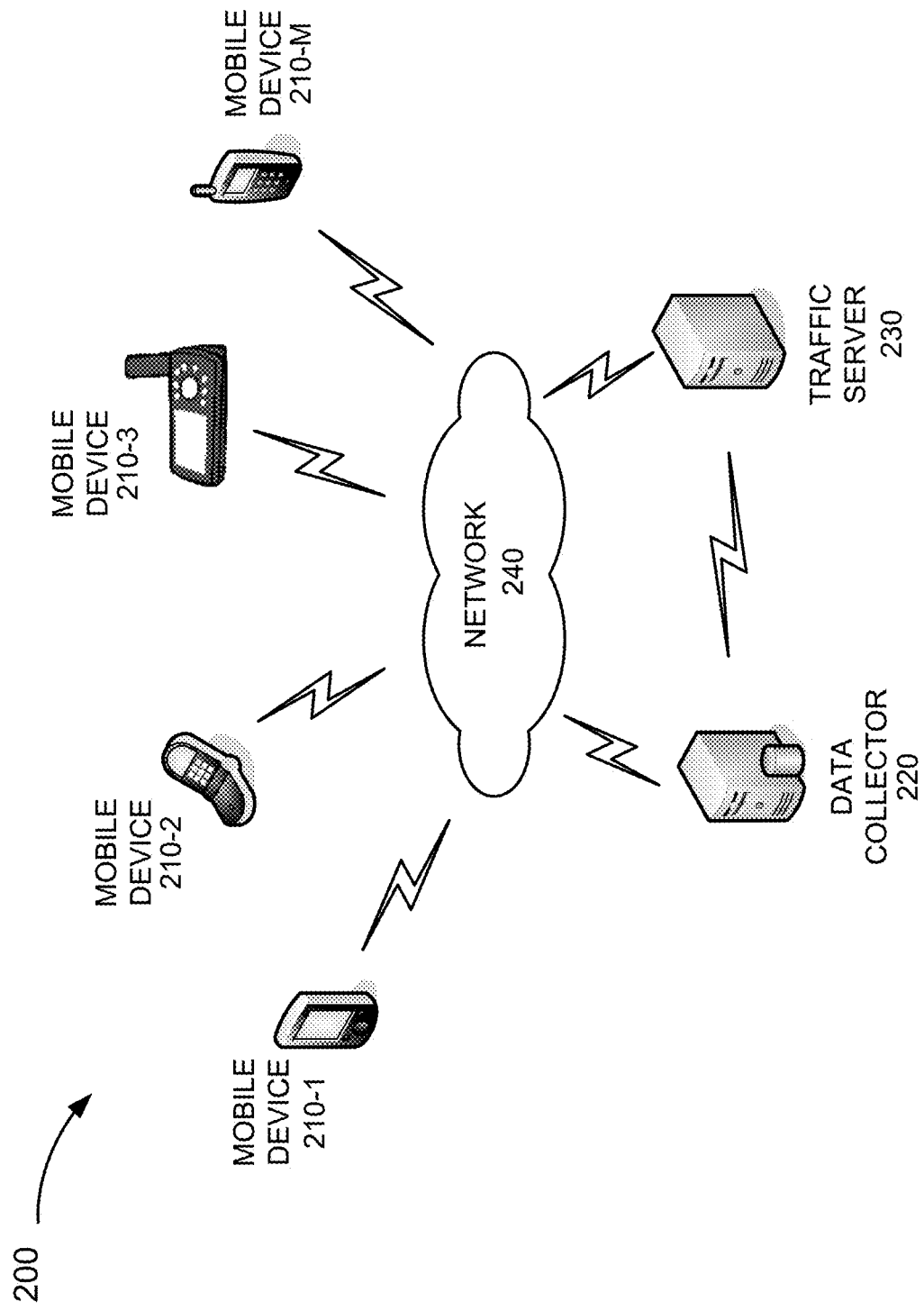
FIG. 2 is a diagram that illustrates an exemplary environment in which systems and/or methods, described herein, may be implemented.

FIG. 2 is a diagram that illustrates an exemplary environment 200 in which systems and/or methods, described herein, may be implemented. As shown in FIG. 2, environment 200 may include mobile devices 210-1, 210-2, . . . , 210-M (collectively referred to as "mobile devices 210," and individually as "mobile device 210"), a data collector 220, a traffic server 230, and a network 240. While FIG. 2 shows a particular number and arrangement of devices, in practice, environment 200 may include additional, fewer, different, or differently arranged devices than are shown in FIG. 2. For example, environment 200 may include multiple data collectors 220 and/or traffic servers 230. Alternatively, data collector 220 and traffic server 230 may be implemented within a single device. Alternatively, data collector 220 may be implemented within multiple, possibly distributed devices, and/or traffic server 230 may be implemented within multiple, possibly distributed devices.

Mobile device 210 may include any portable device capable of executing a navigation application. For example, mobile device 210 may correspond to a mobile communication device (e.g., a mobile phone or a personal digital assistant (PDA)), a navigational device (e.g., a global positioning system (GPS) device or a global navigation satellite system (GNSS) device), a laptop, or another type of portable device.

Data collector 220 may include a server device, such as a computer device, that collects geographic location and traveling speed data from mobile devices 210. Data collector 220 may also build the traffic layers, which were briefly described above, and provide the traffic layers to traffic server 230. Traffic server 230 may include a server device, such as a computer device, that provides relevant traffic information to mobile devices 210.

Network 240 may include any type of network or a combination of networks. For example, network 240 may include a local area network (LAN), a wide area network (WAN) (e.g., the Internet), a metropolitan area network (MAN), an ad hoc network, a telephone network (e.g., a Public Switched Telephone Network (PSTN), a cellular network, or a voice-over-IP (VoIP) network), or a combination of networks.

Figure 3:
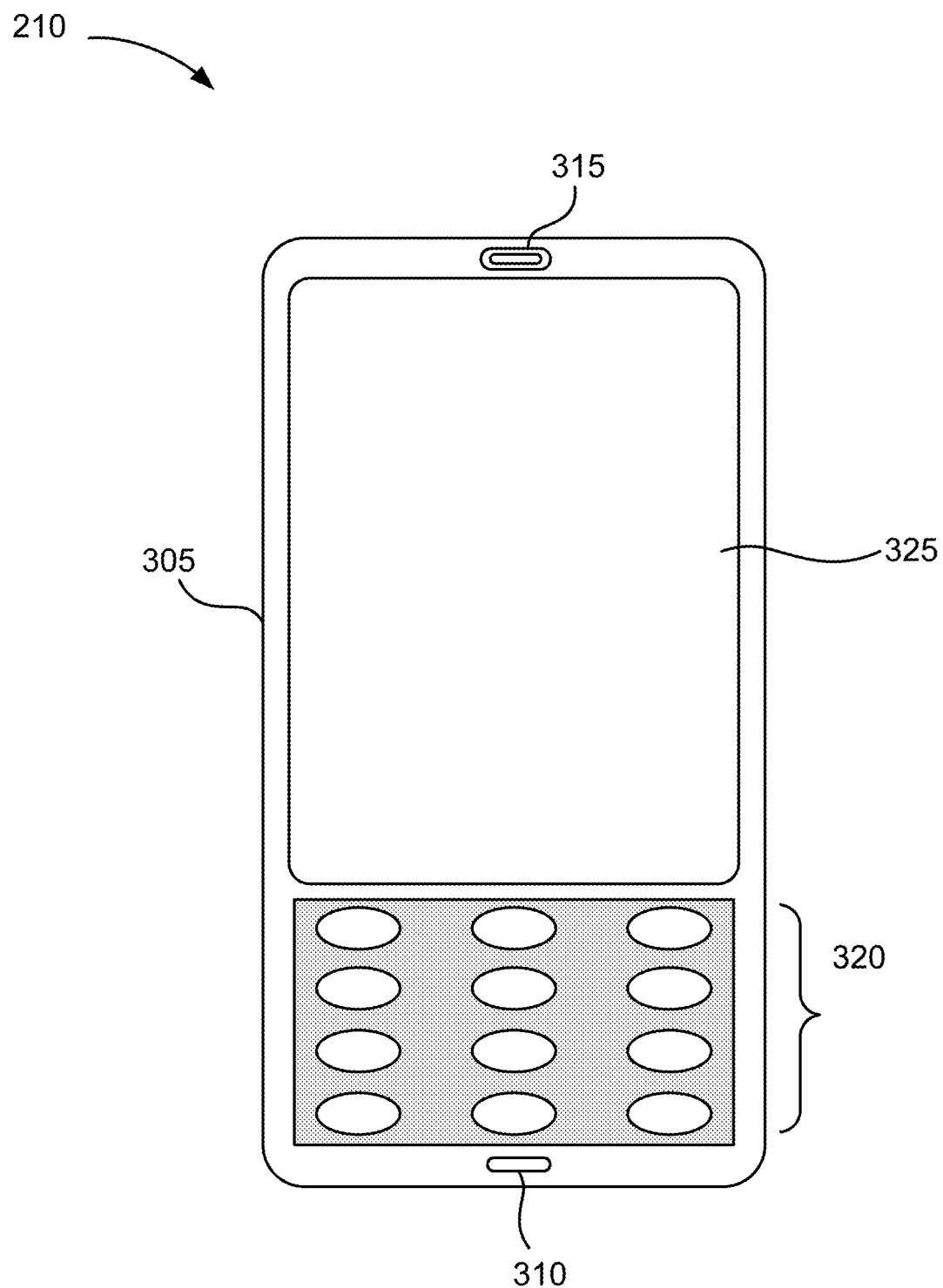
FIG. 3 is a diagram of an exemplary mobile device of FIG. 2.

FIG. 3 is a diagram of an exemplary implementation of mobile device 210. In the implementation shown in FIG. 3, mobile device 210 may correspond to a mobile communication device. Mobile device 210 may include a housing 305, a microphone 310, a speaker 315, a keypad 320, and a display 325. In other implementations, mobile device 210 may include fewer, additional, and/or different components, and/or a different arrangement of components than those illustrated in FIG. 3 and described herein. For example, mobile device 210 may not include microphone 310, speaker 315, and/or keypad 320.

Housing 305 may include a structure to contain components of mobile device 210. For example, housing 305 may be formed from plastic, metal, or some other material. Housing 305 may support microphone 310, speakers 315, keypad 320, and display 325.

Microphone 310 may include an input device that converts a sound wave to a corresponding electrical signal. For example, the user may speak into microphone 310 during a telephone call or to execute a voice command. Speaker 315 may include an output device that converts an electrical signal to a corresponding sound wave. For example, the user may listen to music, listen to a calling party, or listen to other auditory signals through speaker 315.

Keypad 320 may include an input device that provides input into mobile device 210. Keypad 320 may include a standard telephone keypad, a QWERTY keyboard, and/or some other type or arrangement of keys. Keypad 320 may also include one or more special purpose keys. The user may utilize keypad 320 as an input component to mobile device 210. For example, the user may use keypad 320 to enter information, such as alphanumeric text, to access data, or to invoke a function or an operation.

Display 325 may include an output device that outputs visual content, and/or may include an input device that receives user input (e.g., a touch screen (also known as a touch display)). Display 325 may be implemented according to a variety of display technologies, including but not limited to, a liquid crystal display (LCD), a plasma display panel (PDP), a field emission display (FED), a thin film transistor (TFT) display, or some other type of display technology. Additionally, display 325 may be implemented according to a variety of sensing technologies, including but not limited to, capacitive sensing, surface acoustic wave sensing, resistive sensing, optical sensing, pressure sensing, infrared sensing, gesture sensing, etc. Display 325 may be implemented as a single-point input device (e.g., capable of sensing a single touch or point of contact) or a multipoint input device (e.g., capable of sensing multiple touches or points of contact that occur at substantially the same time).

Figure 4A:
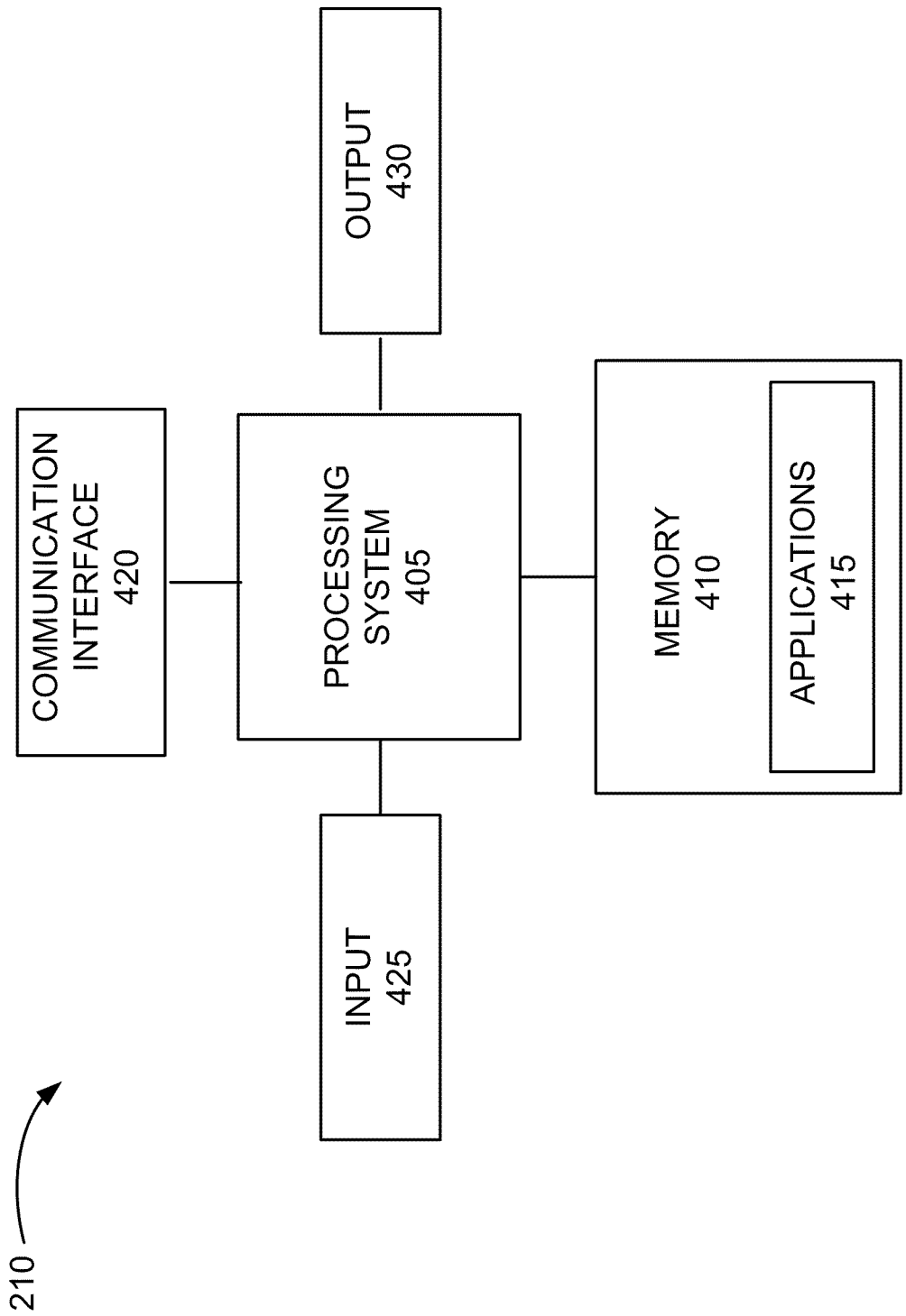
FIG. 4A is a diagram of exemplary components of the mobile device of FIG. 3.

FIG. 4A is a diagram illustrating exemplary components of mobile device 210. As illustrated, mobile device 210 may include a processing system 405, memory 410, a communication interface 420, an input 425, and an output 430. In another implementation, mobile device 210 may include fewer, additional, and/or different components, and/or a different arrangement of components than those illustrated in FIG. 4A. Additionally, in other implementations, a function described as being performed by a particular component may be performed by a different component.

Processing system 405 may include one or more processors, microprocessors, data processors, co-processors, network processors, application specific integrated circuits (ASICs), controllers, programmable logic devices (PLDs), chipsets, field programmable gate arrays (FPGAs), and/or other components that may interpret and/or execute instructions and/or data. Processing system 405 may control the overall operation, or a portion thereof, of mobile device 210, based on, for example, an operating system (not illustrated) and/or various applications. Processing system 405 may access instructions from memory 410, from other components of mobile device 210, and/or from a source external to mobile device 210 (e.g., a network or another device).

Memory 410 may include memory and/or secondary storage. For example, memory 410 may include a random access memory (RAM), a dynamic random access memory (DRAM), a read only memory (ROM), a programmable read only memory (PROM), a flash memory, and/or some other type of memory. Memory 410 may include a hard disk (e.g., a magnetic disk, an optical disk, a magneto-optic disk, a solid state disk, etc.) or some other type of computer-readable medium, along with a corresponding drive. The term "computer-readable medium" is intended to be broadly interpreted to include a memory, a secondary storage, or the like. A computer-readable medium may correspond to, for example, a physical memory device or a logical memory device. A logical memory device may include memory space within a single physical memory device or spread across multiple physical memory devices.

Memory 410 may store data, application(s), and/or instructions related to the operation of mobile device 210. For example, memory 410 may include a variety of applications 415, such as, a navigation application, an e-mail application, a telephone application, a camera application, a voice recognition application, a video application, a multimedia application, a music player application, a visual voicemail application, a contacts application, a data organizer application, a calendar application, an instant messaging application, a texting application, a web browsing application, a blogging application, and/or other types of applications (e.g., a word processing application, a spreadsheet application, etc.).

Communication interface 420 may include a component that permits mobile device 210 to communicate with other devices (e.g., data collector 220 and traffic server 230), networks (e.g., network 240), and/or systems. For example, communication interface 420 may include some type of wireless and/or wired interface.

Input 425 may include a component that permits a user and/or another device to input information into mobile device 210. For example, input 425 may include a keypad (e.g., keypad 320), a button, a switch, a knob, fingerprint recognition logic, retinal scan logic, a web cam, voice recognition logic, a touchpad, an input port, a microphone (e.g., microphone 310), a display (e.g., display 325), and/or some other type of input component. Output 430 may include a component that permits mobile device 210 to output information to the user and/or another device. For example, output 430 may include a display (e.g., display 325), light emitting diodes (LEDs), an output port, a speaker (e.g., speaker 315), and/or some other type of output component.

As described herein, mobile device 210 may perform certain operations in response to processing system 405 executing software instructions contained in a computer-readable medium, such as memory 410. The software instructions may be read into memory 410 from another computer-readable medium or from another device via communication interface 420. The software instructions contained in memory 410 may cause processing system 405 to perform processes described herein. Alternatively, hardwired circuitry may be used in place of or in combination with software instructions to implement processes described herein. Thus, implementations described herein are not limited to any specific combination of hardware circuitry and software.

Figure 4B:
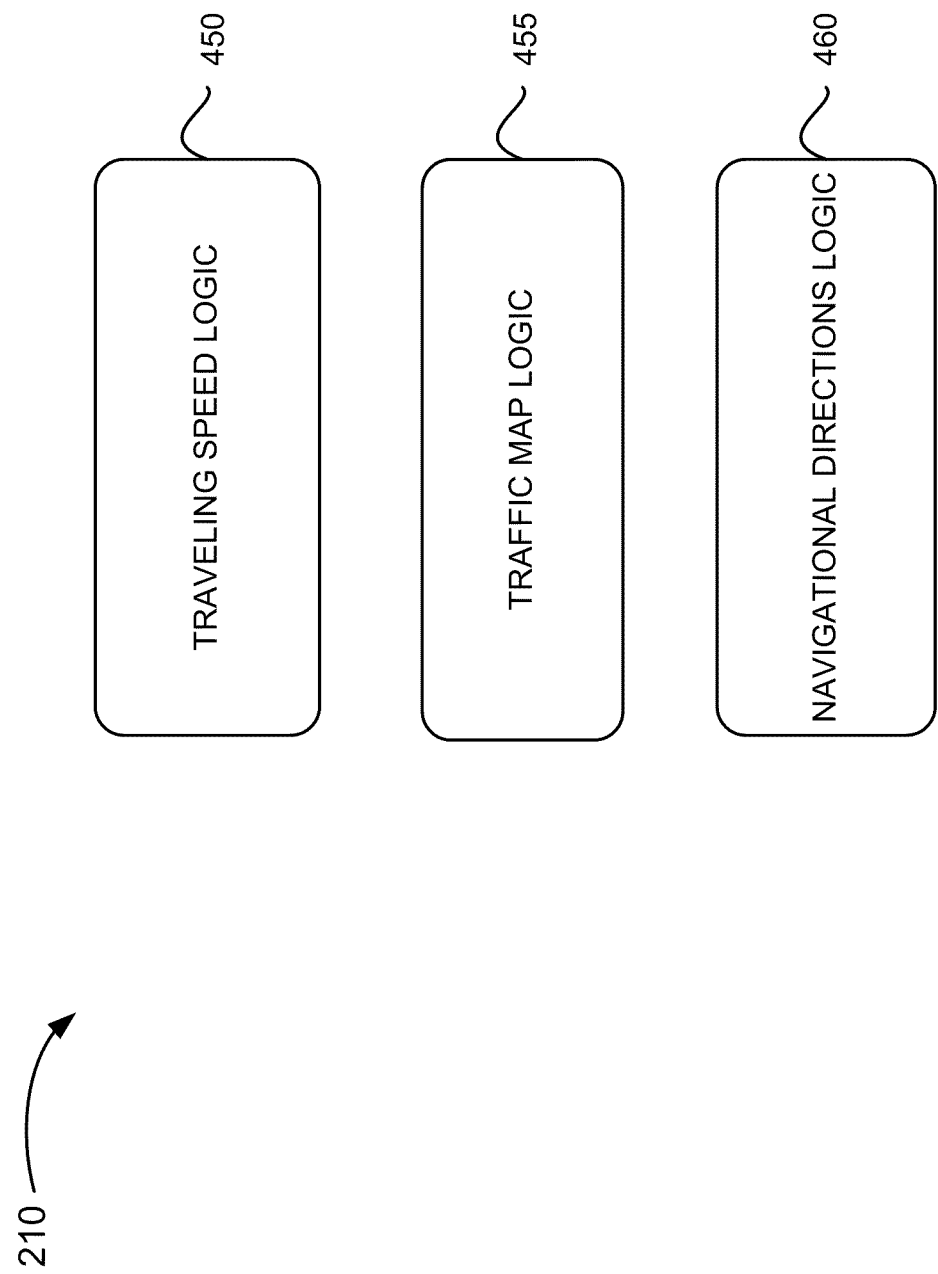
FIG. 4B is a diagram of exemplary functional components of the mobile device of FIG. 3.

FIG. 4B is a diagram of exemplary functional components of mobile device 210. As illustrated in FIG. 4B, mobile device 210 may include traveling speed logic 450, traffic map logic 455, and navigational directions logic 460. Traveling speed logic 450, traffic map logic 455, and navigational directions logic 460 may be implemented as a combination of hardware and software based on the components illustrated and described with respect to FIG. 4A. Alternatively, traveling speed logic 450, traffic map logic 455, and navigational directions logic 460 may be implemented as hardware based on the components illustrated and described with respect to FIG. 4A.

Traveling speed logic 450 may identify the geographic location and traveling speed of mobile device 210, and provide this data to data collector 220. In one implementation, traveling speed logic 450 may use GPS or GNSS signals to determine the geographic location of mobile device 210. In another implementation, traveling speed logic 450 may determine the geographic location of mobile device 210 from a link layer discovery protocol—media endpoint discovery (LLDP-MED)-capable network switch. LLDP-MED is a link layer protocol that allows a network device to discover a geographic location. When requested, a LLDP-MED-capable network switch may send the geographic location of an end device to the port to which the end device is attached. In yet another implementation, traveling speed logic 450 may determine the geographic location of mobile device 210 using another technique, such as tower (e.g., cellular tower) triangularization. The geographic location information may be expressed in a particular form, whether as a set of latitude and longitude coordinates, a set of GPS coordinates, or another format. Traveling speed logic 450 may determine the traveling speed of mobile device 210 by, for example, determining how fast it takes mobile device 210 to travel a known distance. Traveling speed logic 450 may provide the geographic location and traveling speed data to data collector 220.

Traffic map logic 455 may communicate with traffic server 230 to obtain traffic data associated with one or more traffic layers. Traffic map logic 455 may obtain the traffic data when first calculating a set of navigational directions or when re-calculating a set of navigational directions.

Navigational directions logic 460 may use the traffic data, obtained by traffic map logic 455, to calculate a set of navigational directions. In one implementation, described below, navigational directions logic 460 may perform a shortest path computation that takes into account traveling speed (e.g., congestion) on various paths. Navigational directions logic 460 may present turn-by-turn directions to a user of mobile device 210 corresponding to a result of the shortest path computation.

Figure 5A:
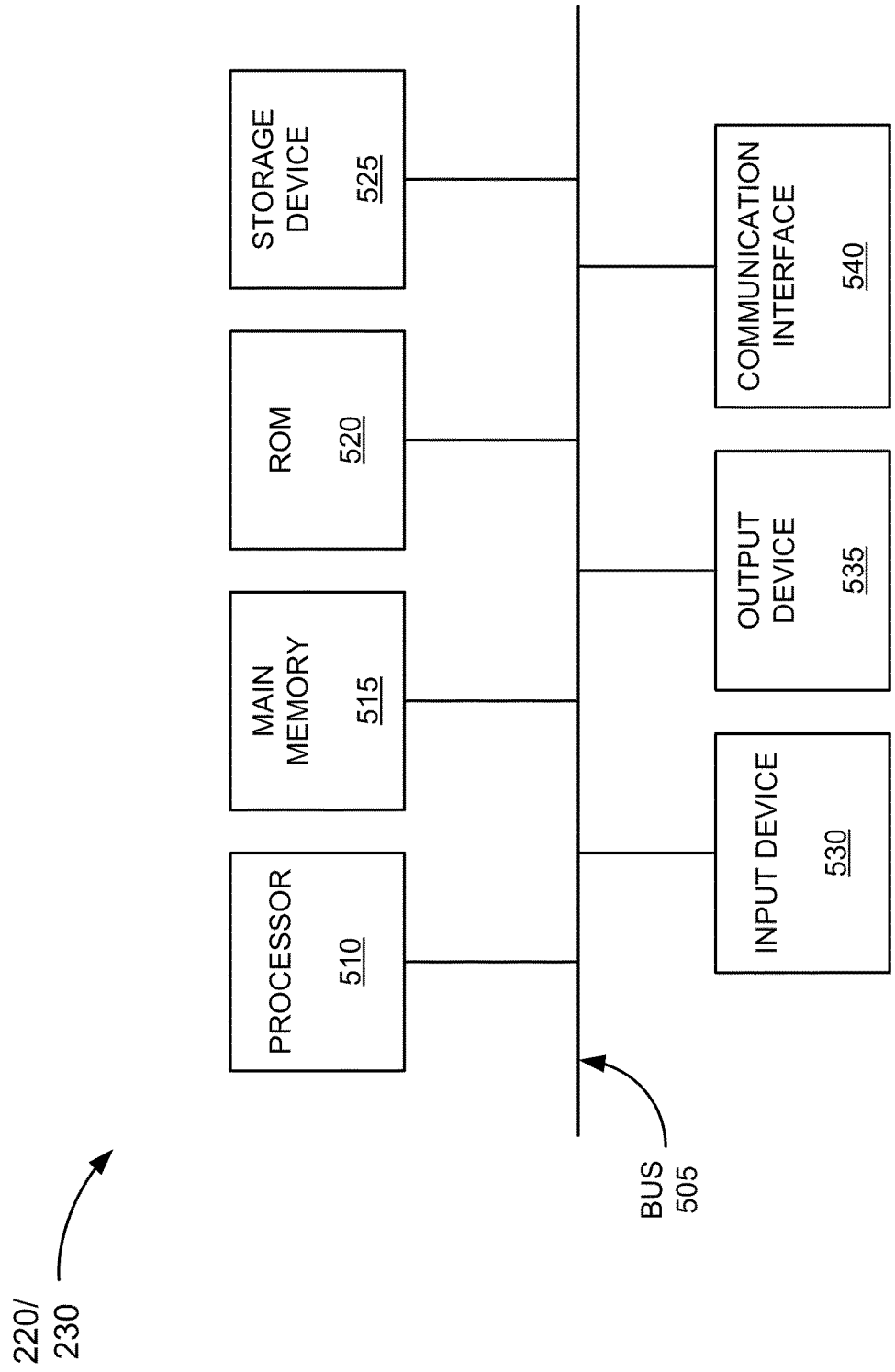
FIG. 5A is a diagram of exemplary components of the data collector and/or traffic server of FIG. 2.

FIG. 5A is a diagram of exemplary components of data collector 220 and/or traffic server 230. As shown in FIG. 5A, data collector 220 and/or traffic server 230 may include a bus 505, a processor 510, a main memory 515, a ROM 520, a storage device 525, an input device 530, an output device 535, and a communication interface 540. In another implementation, data collector 220 and/or traffic server 230 may include additional, fewer, different, or differently arranged components.

Bus 505 may include a path that permits communication among the components of data collector 220 and/or traffic server 230. Processor 510 may include a processor, a microprocessor, an ASIC, a FPGA, or another type of processor that may interpret and execute instructions. Main memory 515 may include a RAM or another type of dynamic storage device that may store information and instructions for execution by processor 510. ROM 520 may include a ROM device or another type of static storage device that may store static information and instructions for use by processor 510. Storage device 525 may include a magnetic storage medium, such as a hard disk drive, or a removable memory, such as a flash memory.

Input device 530 may include a mechanism that permits an operator to input information to data collector 220 and/or traffic server 230, such as a control button, a keyboard, a keypad, or another type of input device. Output device 535 may include a mechanism that outputs information to the operator, such as a LED, a display, or another type of output device. Communication interface 540 may include any transceiver-like mechanism that enables data collector 220 and/or traffic server 230 to communicate with other devices (e.g., mobile devices 210) and/or networks (e.g., network 240). In one implementation, communication interface 540 may include one or more ports, such as an Ethernet port, a file transfer protocol (FTP) port, or a transmission control protocol (TCP) port, via which data may be received and/or transmitted.

Data collector 220 and/or traffic server 230 may perform certain operations, as described in detail below. Data collector 220 and/or traffic server 230 may perform these operations in response to processor 510 executing software instructions contained in a computer-readable medium, such as main memory 515.

The software instructions may be read into main memory 515 from another computer-readable medium, such as storage device 525, or from another device via communication interface 540. The software instructions contained in main memory 515 may cause processor 510 to perform processes that will be described later. Alternatively, hardwired circuitry may be used in place of or in combination with software instructions to implement processes described herein. Thus, implementations described herein are not limited to any specific combination of hardware circuitry and software.

Figure 5B:
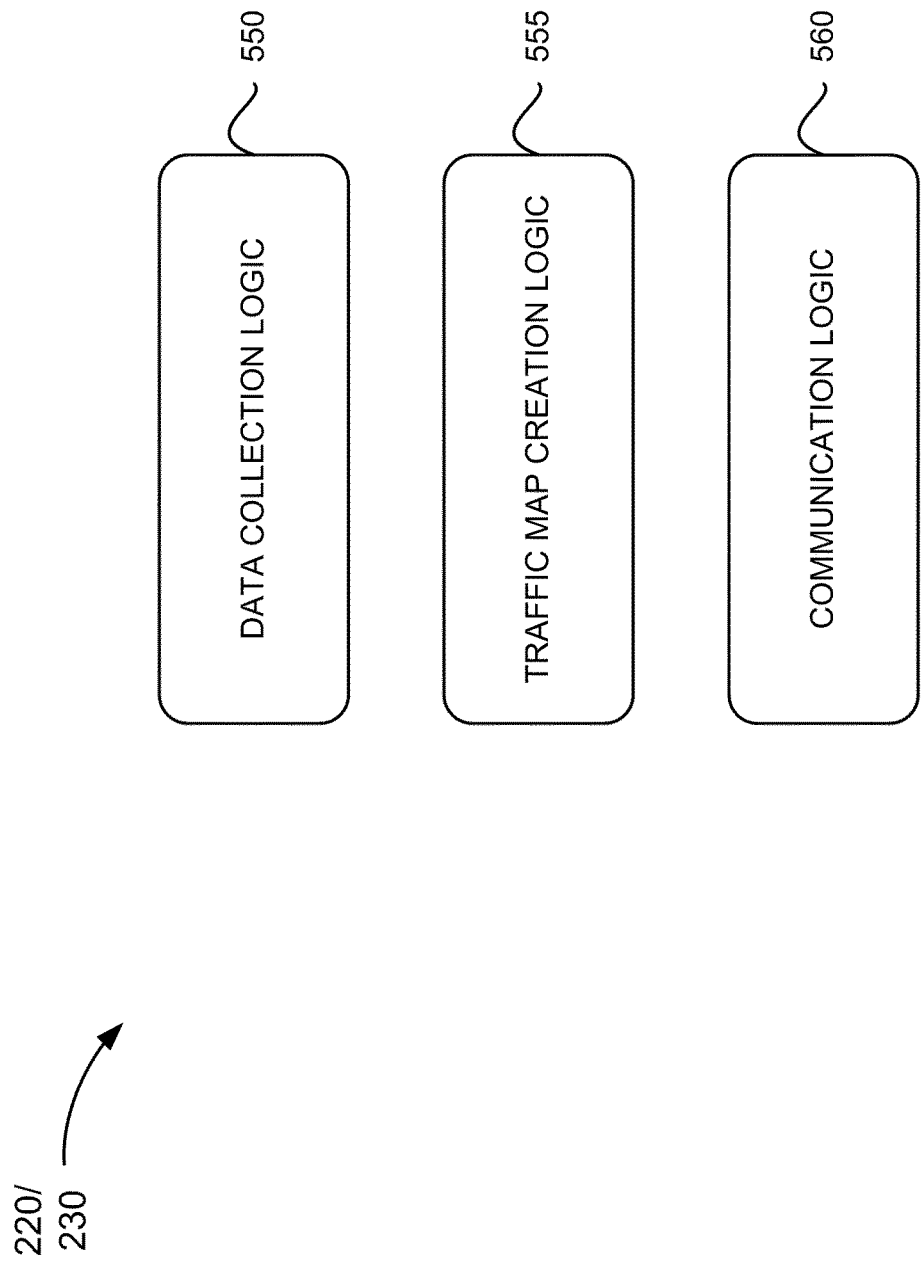
FIG. 5B is a diagram of exemplary functional components of the data collector and/or traffic server of FIG. 2.

FIG. 5B is a diagram of exemplary functional components of data collector 220 and/or traffic server 230. As shown in FIG. 5B, data collector 220 and/or traffic server 230 may include data collection logic 550, traffic map creation logic 555, and communication logic 560. Data collection logic 550, traffic map creation logic 555, and communication logic 560 may be implemented as a combination of hardware and software based on the components illustrated and described with respect to FIG. 5A. Alternatively, data collection logic 550, traffic map creation logic 555, and communication logic 560 may be implemented as hardware based on the components illustrated and described with respect to FIG. 5A.

Data collection logic 550 may collect real-time geographic location and traveling speed data from mobile devices 210. Data collection logic 550 may also instruct mobile devices 210 on when to provide geographic location and traveling speed data. Data collection logic 550 may aggregate geographic location and traveling speed data collected from a group of mobile devices 210, process and/or store the collected data.

Traffic map creation logic 555 may create traffic map layers based on the data collected by data collection logic 550. As described above, a traffic map layer may correspond to a map layer and include information regarding traffic congestion. Communication logic 560 may send relevant traffic map layer data to mobile devices 210. Communication logic 560 may determine what traffic map layer data is relevant to a particular mobile device 210 based on a geographic location of the particular mobile device 210 and a destination geographic location for which a user, of the particular mobile device 210, has sought navigational directions.

Figure 6:
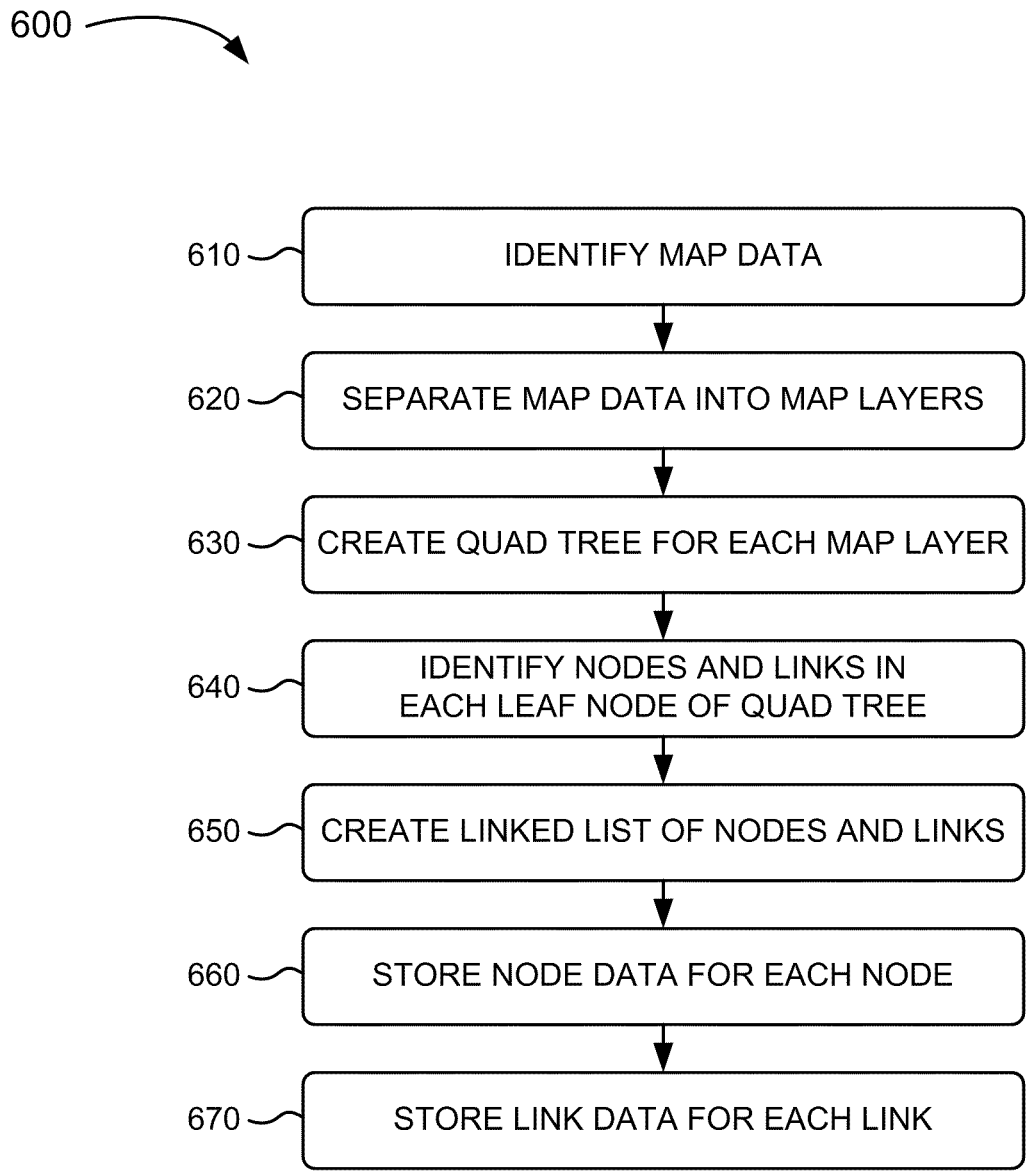
FIG. 6 is a flowchart of an exemplary process for storing map data.

FIG. 6 is a flowchart of an exemplary process 600 for storing map data. In one implementation, process 600 may be performed by one or more components of data collector 220. In another implementation, one or more blocks of process 600 may be performed by one or more components of another device (e.g., traffic server 230), or a group of devices including or excluding data collector 220.

Process 600 may include identifying map data (block 610). For example, map data, of a road network, is available from a number of third party providers of map data. One such third party provider includes the United States Geological Survey. In one implementation, data collector 220 may obtain map data associated with a particular geographic region (e.g., the continental United States). The basic objects, of the map data, may include points (called "nodes") and lines (called "links"). A "node" may represent an intersection of two roads or a point within a road (e.g., a highway, or another road, may have multiple nodes that are independent of the intersection of that highway with any other road). A "link" may represent a portion of a road between two nodes.

The map data may be separated into map layers (block 620). For example, data collector 220 may separate the map data into multiple map layers. In one implementation, the map layers may include an interstate highway layer, a state highway layer, and a local street layer. In another implementation, the map layers may include fewer, additional, or different layers. For example, the map layers may include an unclassified road layer (e.g., including information regarding some unpaved roads) and/or a regular streets layer (e.g., including information regarding local streets that are not included in the local street layer). Each of the map layers may include information regarding the nodes and links associated with that map layer. Each of the map layers may be represented as a linked graph of nodes and links in two dimensional space.

Figure 7:
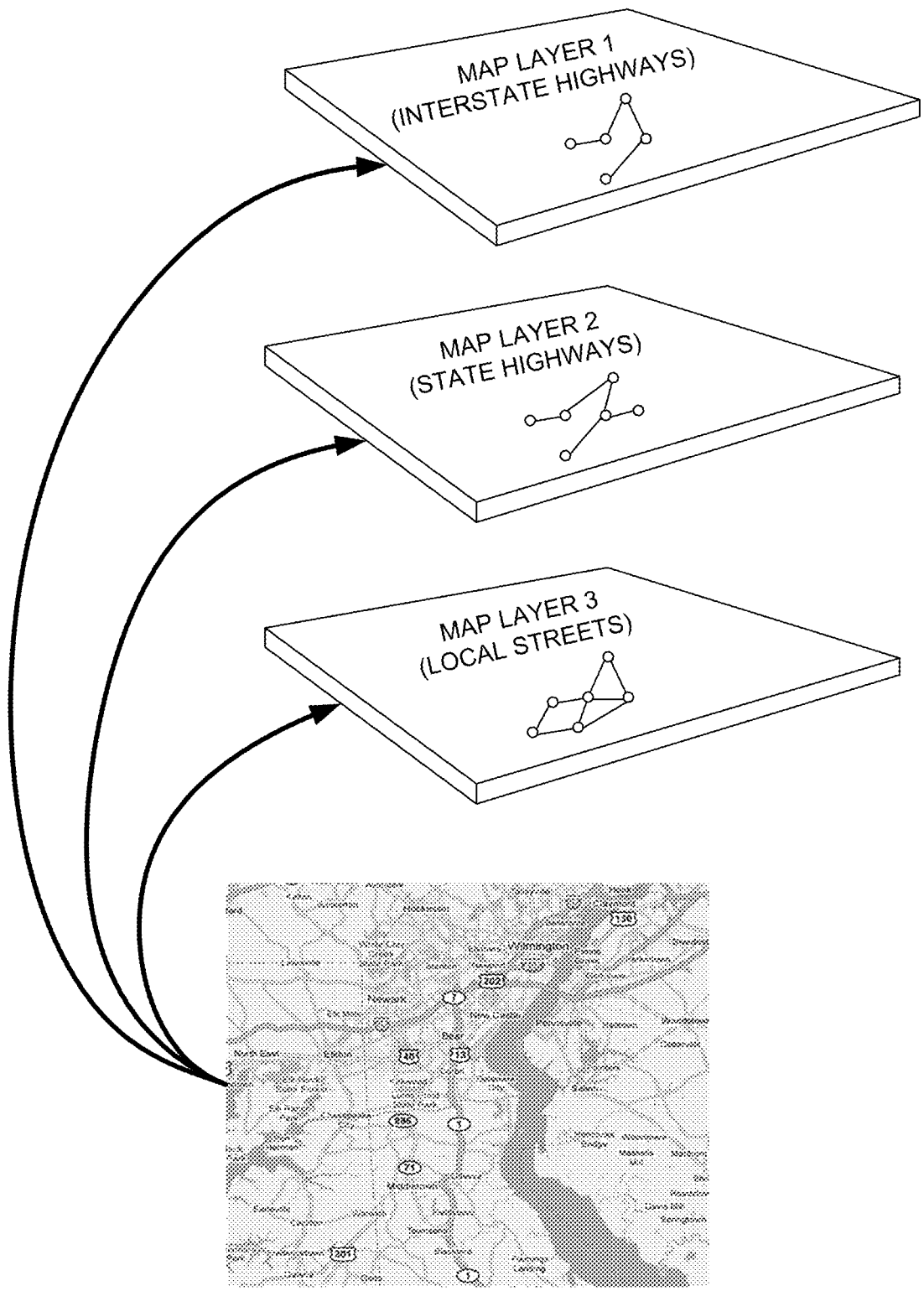
FIG. 7 is a diagram illustrating an exemplary segmenting of map data into map layers.

FIG. 7 is a diagram illustrating an exemplary segmenting of map data into map layers. As shown in FIG. 7, map data, of a road network, may be separated into different map layers. For example, as shown in FIG. 7, the nodes and links, associated with interstate highways, may be included in the interstate highway layer (shown as layer 1); the nodes and links, associated with state highways, may be included in the state highway layer (shown as layer 2); and the nodes and links, associated with local streets, may be included in the local street layer (shown as layer 3). Each of these map layers may include a linked graph of the nodes and links, associated with that map layer, in two dimensional space.

Returning to FIG. 6, a quad tree may be created for each of the map layers (block 630). For example, data collector 220 may partition a map layer into quads using a quad tree data structure. A quad tree data structure may include a data structure that partitions the information into quads. Each quad may be bounded by its geographic borders (e.g., longitude and latitude coordinates of the borders). Each leaf node of the quad tree may include the nodes and links contained within the leaf node. The quad tree may facilitate the searching for nodes and/or links of interest.

Data collector 220 may start with a geographic region (e.g., the continental United States, a particular state, or another bounded region). If the number of objects (e.g., nodes and/or links) in the geographic region is smaller than a threshold value, then data collector 220 may not partition the geographic region. In one implementation, the threshold value may be set at approximately 200. In another implementation, the threshold value may be set at another value that may be greater or smaller than 200.

If the number of objects in the geographic region is not smaller than the threshold value, then data collector 220 may partition the geographic region into four disjoint congruent square regions (e.g., called the northwest, northeast, southwest, and southeast quadrants) whose union covers the entire geographic region. Data collector 220 may examine each of these quadrants to determine if the number of objects in the quadrant is smaller than the threshold value. If the number of objects in the quadrant is smaller than the threshold value, then data collector 220 may not further partition the quadrant. If the number of objects is not smaller than the threshold value, then data collector 220 may further partition the quadrant into four disjoint congruent square regions. Data collector 220 may repeat this process until the number of objects in each quadrant is smaller than the threshold value. This process may form a quad tree, where the root of the quad tree represents the entire geographic region and the leaf nodes represent quadrants into which the geographic region was partitioned. The geographic region, as well as the leaf nodes, may have identifiable borders defined by, for example, sets of longitude and latitude coordinates.

Figure 8A:
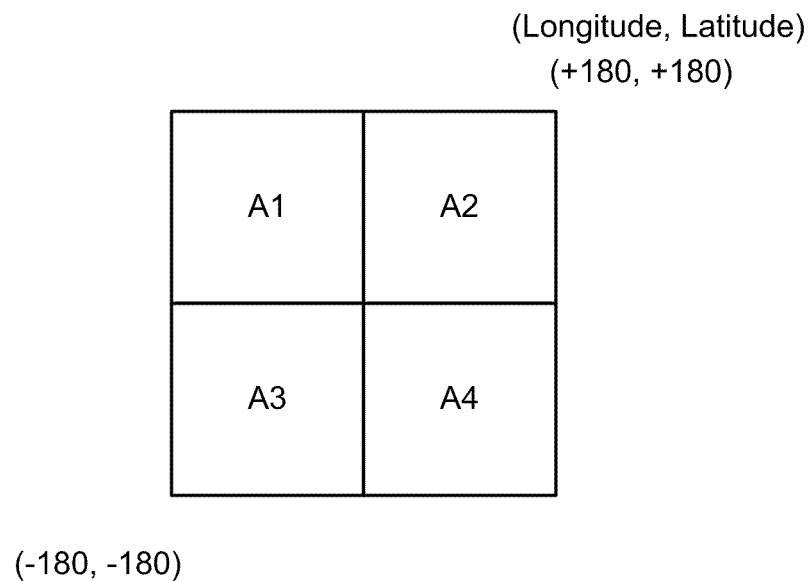
FIGS. 8A and 8B are diagrams illustrating an exemplary simple quad tree with four leaf nodes.
Figure 8B:
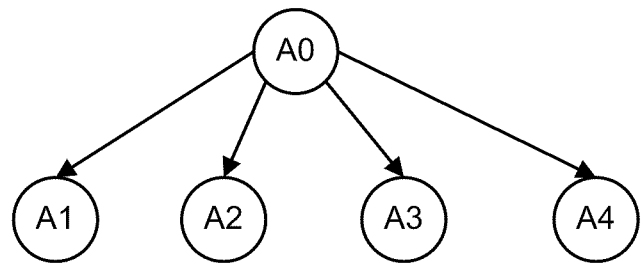

FIGS. 8A and 8B are diagrams illustrating an exemplary simple quad tree with four leaf nodes. As shown in FIG. 8A, assume that a geographic region (region A0) is bounded by borders defined by longitude and latitude coordinates of (+180, +180) and (−180, −180). Further assume that the geographic region includes a number of objects that is not smaller than the threshold value. Thus, the geographic region may be partitioned into four disjoint congruent square regions (e.g., shown as quadrants A1, A2, A3, and A4 in FIG. 8A) whose union covers the entire geographic region (i.e., region A0). Assume that each of the quadrants includes a number of objects that is smaller than the threshold value. Thus, none of the quadrants may be further partitioned. As shown in FIG. 8B, the quad tree may be represented by a root (corresponding to region 0) and four leaf nodes (corresponding to quadrants A1, A2, A3, and A4).

Figure 9A:
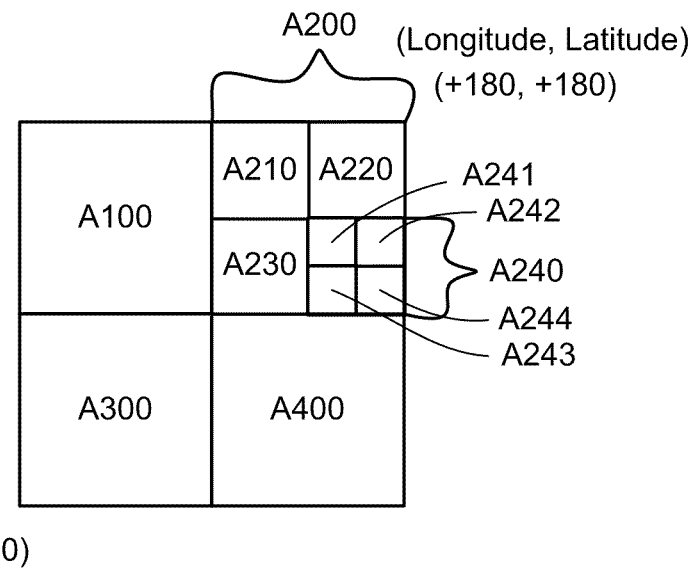
FIGS. 9A and 9B are diagrams illustrating an exemplary quad tree with ten leaf nodes.
Figure 9B:
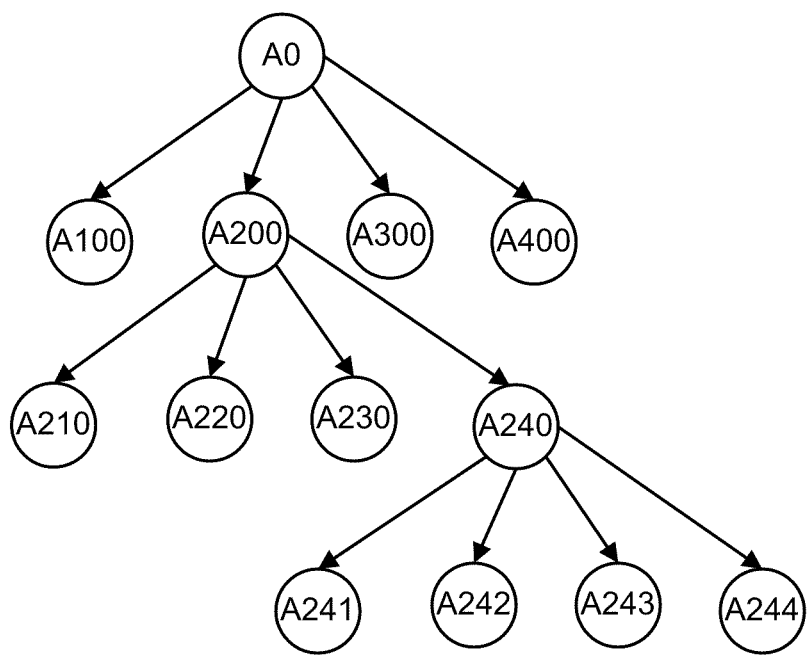

FIGS. 9A and 9B are diagrams illustrating an exemplary quad tree with ten leaf nodes. As shown in FIG. 9A, assume that a geographic region (region A0) is bounded by borders identified by longitude and latitude coordinates of (+180, +180) and (−180, −180). Further assume that the geographic region includes a number of objects that is not smaller than the threshold value. Thus, the geographic region may be partitioned into four disjoint congruent square regions (e.g., shown as quadrants A100, A200, A300, and A400 in FIG. 9A) whose union covers the entire geographic region (i.e., region A0). Assume that quadrants A100, A300, and A400 include a number of objects that is smaller than the threshold value and, thus, none of these quadrants may be further partitioned. Further assume that quadrant A200 includes a number of objects that is not smaller than the threshold value and, thus, quadrant A200 may be further partitioned into four disjoint congruent square regions (e.g., shown as quadrants A210, A220, A230, and A240 in FIG. 9A) whose union covers the entire geographic region (i.e., quadrant A200). Also assume that quadrant A240 includes a number of objects that is not smaller than the threshold value and, thus, quadrant A240 may be further partitioned into four disjoint congruent square regions (e.g., shown as quadrants A241, A242, A243, and A244 in FIG. 9A) whose union covers the entire geographic region (i.e., quadrant A240). Finally, assume that each of quadrants A241, A242, A243, and A244 includes a number of objects that is smaller than the threshold value and, thus, none of these quadrants may be further partitioned. As shown in FIG. 9B, the quad tree may be represented by a root (corresponding to region 0) and ten leaf nodes (corresponding to quadrants A100, A210, A220, A230, A241, A242, A243, A244, A300, and A400).

Returning to FIG. 6, the nodes and links in each leaf node of the quad tree may be identified (block 640). For example, as described above, the borders of the quadrants may be defined by sets of longitude and latitude coordinates. As described above, a node may represent an intersection of two links or a point along a link (e.g., a highway, or another type of long road, may include multiple nodes that are independent of the intersection of that highway with any other road). As described above, a link may represent a road that spans between two nodes. Thus, each node and link may include an identifiable geographic location. Data collector 220 may determine, based on the geographic locations of the nodes and links and the borders of the quadrants, in which of the quadrants, the nodes and links are located.

Figure 10:
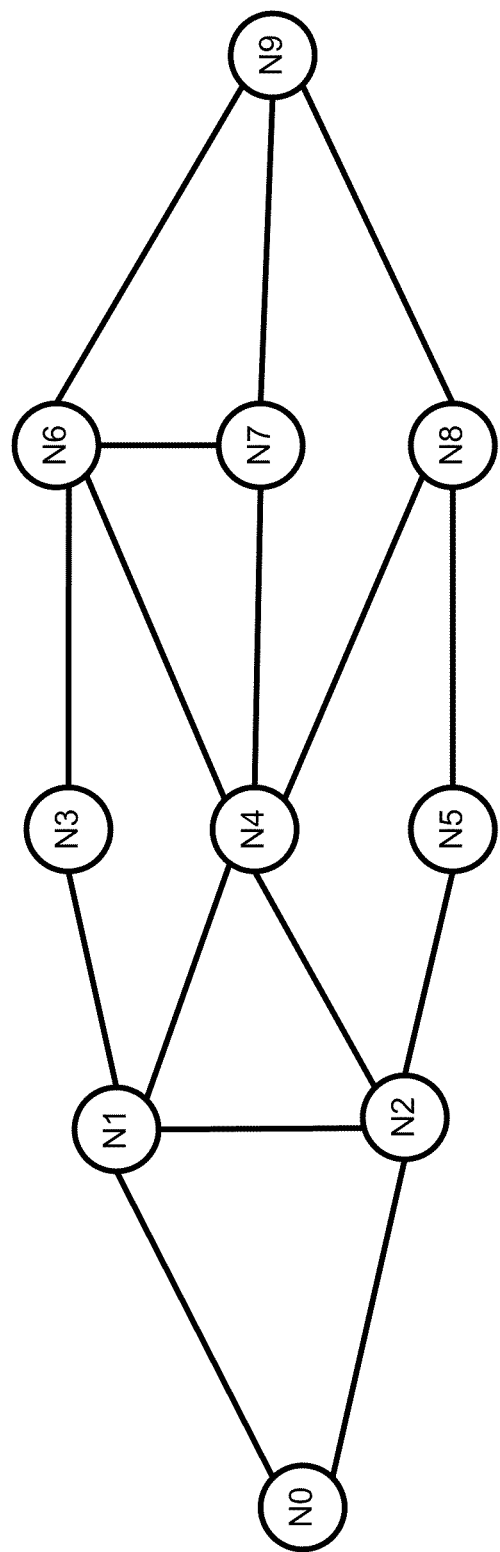
FIG. 10 is a diagram illustrating an exemplary linked list of nodes and links.

A linked list of nodes and links may be created (block 650). For example, data collector 220 may create a linked list data structure containing the nodes and links. FIG. 10 is a diagram illustrating a linked list of nodes and links. As shown in FIG. 10, a number of nodes (shown as nodes N0-N9) may be interconnected by links Information regarding the nodes and links connecting the nodes may be stored as a linked list in memory. For example, information regarding a particular node may include a pointer to information regarding the link(s) to which the particular node connects.

Returning to FIG. 6, node data may be stored for each of the nodes (block 660), and link data may be stored for each of the links (block 670). For example, data collector 220 may store certain information regarding the nodes and links. In one implementation, each of the nodes and links in the linked list may contain a pointer to the corresponding node data and link data.

FIG. 11 is a diagram of an exemplary data structure 1100 that may store node data. As shown in FIG. 11, data structure 1100 may include a node identifier field 1110, a node location field 1120, a node name field 1130, a links field 1140, and a layer field 1150. In another implementation, data structure 1100 may store fewer, additional, or different fields.

Node identifier field 1110 may store an identifier that uniquely identifies a particular node. Node location field 1120 may store information that identifies the geographic location of the particular node. The information, in node location field 1120, may be represented, for example, as a set of longitude and latitude coordinates. Node name field 1130 may store a name of the particular node (e.g., the intersection of First Street and Main Street, mile marker 101 on U.S. Highway 66, etc.). Links field 1140 may store information that identifies the links connected to the particular node. Layer field 1150 may store information that identifies the map layer with which the node is associated. The information, in layer field 1150, may be useful in quickly identifying the map layer with which the particular node is associated.

FIG. 12 is a diagram of an exemplary data structure 1200 that may store link data. As shown in FIG. 12, data structure 1200 may include a link identifier field 1210, an end nodes field 1220, a link name field 1230, a speed field 1240, a type of link field 1250, and a layer field 1260. In another implementation, data structure 1200 may store fewer, additional, or different fields.

Link identifier field 1210 may store an identifier that uniquely identifies a particular link. End nodes field 1220 may store information that identifies the nodes to which the particular link connects. In one implementation, the information, in end nodes filed 1220, may include the node identifiers of the nodes to which the particular link connects. Link name field 1230 may store a name of the particular link (e.g., Main Street, U.S. Highway 66, etc.). Speed field 1240 may store information regarding the traveling speed on the particular link. As described above, data collector 220 may collect real-time geographic location and traveling speed data from mobile devices 120. Based on this collected information, data collector 220 may calculate the traveling speed on a particular link. In one implementation, this calculation might be the average of the last X data samples (where X>1). Type of link field 1250 may store information that identifies whether the particular link corresponds to a highway, a road, a street, etc. Layer field 1260 may store information that identifies the map layer with which the link is associated. The information, in layer field 1250, may be useful in quickly identifying the map layer with which the particular link is associated.

Figure 13:
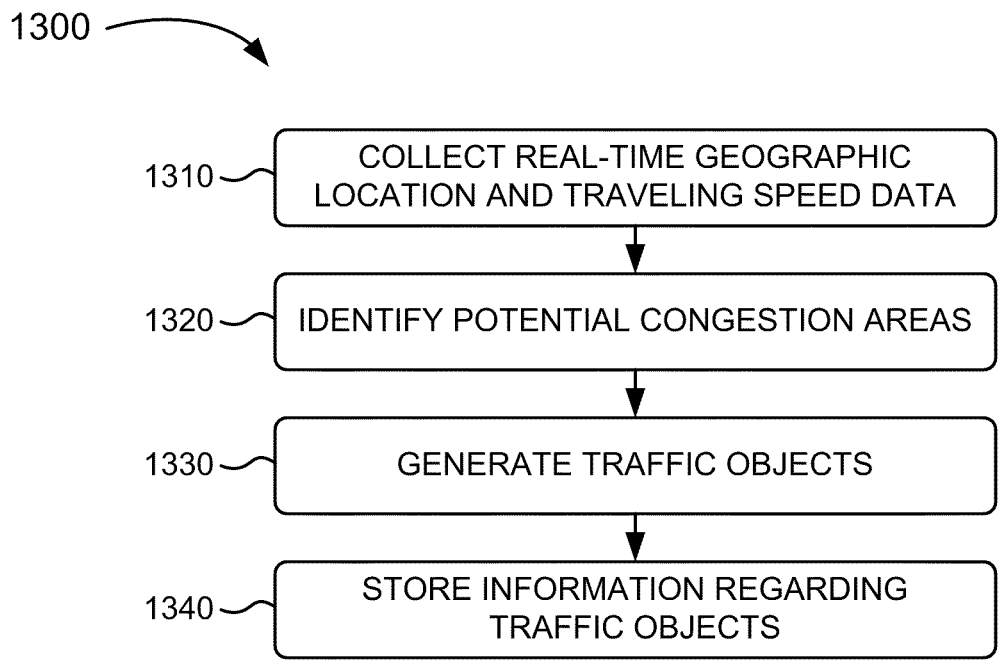
FIG. 13 is a flowchart of an exemplary process for storing traffic objects.

FIG. 13 is a flowchart of an exemplary process 1300 for storing traffic objects. In one implementation, process 1300 may be performed by one or more components of data collector 220. In another implementation, one or more blocks of process 1300 may be performed by one or more components of another device (e.g., traffic server 230), or a group of devices including or excluding data collector 220.

Process 1300 may include collecting real-time geographic location and traveling speed data (block 1310). For example, data collector 220 may collect real-time geographic location and traveling speed data from mobile devices 120. In one implementation, mobile devices 120 may send the geographic location and traveling speed data to data collector 220 when instructed by data collector 220. For example, data collector 220 may identify when and how often a mobile device 210 reports its geographic location and traveling speed data. In another implementation, the time interval at which mobile devices 120 report their geographic location and traveling speed data may be programmed in mobile devices 120. For example, a mobile device 210 may be programmed to report its geographic location and traveling speed data pre-established times (e.g., every 60 seconds).

Potential congestion areas may be identified (block 1320). For example, data collector 220 may identify potential congestion areas based on the real-time geographic location and traveling speed data collected from mobile devices 210. Data collector 220 may also identify potential congestion areas based on historical information or statistics from previously identified areas of congestion. For example, it may be determined that a particular area regularly has traffic congestion at a particular time of day (e.g., the Washington Bridge is an area of traffic congestion for east-bound, morning (e.g., between 6 am and 10 am) traffic from New Jersey to New York, and is an area of traffic congestion for west-bound, evening (e.g., between 3 pm and 7 pm) traffic from New York to New Jersey). Data collector 220 may identify the areas of potential congestion based on the real-time geographic location and traveling speed data collected from mobile devices 210 and/or previously identified areas of congestion.

Traffic objects may be generated (block 1330). For example, data collector 220 may generate traffic objects corresponding to the potential congestion areas. A traffic object may take different forms. For example, a traffic object may correspond to a node object, a link object, a box object, or a turn object. A node object may correspond to a node of a map layer. A link object may correspond to a link of a map layer. A box object may correspond to a region that has two pairs of geographic locations: a lower-left corner and an upper right corner. A turn object may correspond to a turn from one road to another and has three locations: a beginning point, a turning point, and an ending point. For each of the potential congestion areas, data collector 220 may generate a traffic object corresponding to the potential congestion area.

Information regarding the traffic objects may be stored (block 1340). For example, data collector 220 may store certain information for each of the traffic objects in an efficient way so that the traffic data can be updated quickly and the traffic data can be distributed to mobile devices 210 efficiently. In one implementation, data collector 220 may segment the traffic map into a number of layers, corresponding to the map layers. For each of the traffic map layers, data collector 220 may store the traffic objects in a quad tree data structure to permit quick searches and updates. As explained above, a quad tree may include a root node and a number of leaf nodes. Each of the leaf nodes may include zero or more traffic objects. For each traffic object, data collector 220 may find the closest node and/or link in a traffic map layer and associated that traffic object with the closest node and/or link. Data collector 220 may store information for each of the traffic objects.

Figure 14:
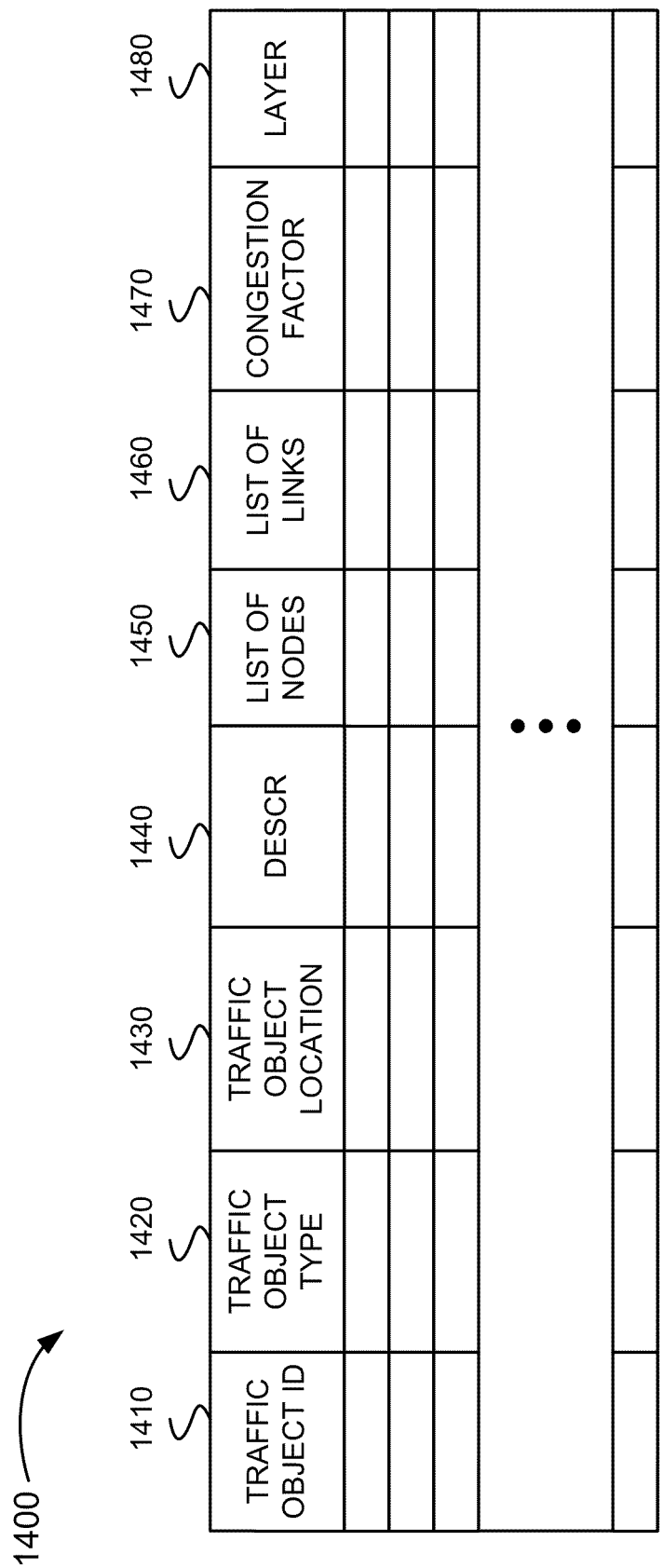
FIG. 14 is a diagram of an exemplary data structure that may store traffic object data.

FIG. 14 is a diagram of an exemplary data structure 1400 that may store traffic object data. As shown in FIG. 14, data structure 1400 may include a traffic object identifier field 1410, a traffic object type field 1420, a traffic object location field 1430, a description field 1440, a list of nodes field 1450, a list of links field 1460, a congestion factor field 1470, and a layer field 1480. In another implementation, data structure 1400 may store fewer, additional, or different fields.

Traffic object identifier field 1410 may store an identifier that uniquely identifies a particular traffic object. Traffic object type field 1420 may store information that identifies the type of traffic object corresponding to the particular traffic object. For example, the information, in traffic object type field 1420, may identify the particular traffic object as a node object, a link object, a box object, or a turn object.

Traffic object location field 1430 may store information that identifies the geographic location of the particular traffic object. The geographic location information may differ depending on whether the particular traffic object is a node object, a link object, a box object, or a turn object. For example, for a node object, the geographic location information may include a set of longitude and latitude coordinates (e.g., −71.163893, 42.704885). For a link object, the geographic location information may include two sets of longitude and latitude coordinates that define two end points of the link object (e.g., [−71.26183, 42.396555] to [−71.262474, 42.384669]). For a box object, the geographic location information may include two sets of longitude and latitude coordinates that define the lower-left corner and upper-right corner of the box object (e.g., [−71.09946, 42.344986], [−71.092315, 42.347412]). For a turn object, the geographic location information may include three sets of longitude and latitude coordinates that define the beginning point, the turning point, and the ending point of the turn object (e.g., [−71.120054, 42.502292], [−71.119056, 42.502114], [−71.118933, 42.501703]).

Description field 1440 may store information describing the traffic congestion. For example, the information, in description field 1440, may include something like "Delay east bound on Washington Bridge" (for a node object), "Slow traffic on Route 128 south bound from Winter Street to Main Street" (for a link object), "Fenway Red Sox game going on in this region" (for a box object), or "Slow turn from Route 128 north to Route 93 south" (for a turn object). List of nodes field 1450 may store information regarding one or more nodes (of one or more map layers) that most closely correspond to the geographic location of the particular traffic objects. The information, in list of nodes field 1450, may help in quickly identifying nodes, of a road network, that correspond to an area of traffic congestion. The list of links field 1460 may store information regarding one or more links (of one or more map layers) that most closely correspond to the geographic location of the particular traffic objects. The information, in list of links field 1460, may help in quickly identifying links, of a road network, that correspond to an area of traffic congestion.

Congestion factor field 1470 may store information regarding a congestion factor, which may reflect an amount of congestion associated with the particular traffic object. The congestion factor may be determined based on traveling speed data obtained from mobile devices 120 in the congestion area. In one implementation, the congestion factor may be determined by averaging traveling speed data over some number of data samples (e.g., over the last ten data samples), and then calculating the congestion factor based on the average traveling speed data. The congestion factor may be expressed in different ways, such as the amount of time that it may take to traverse the traffic object (e.g., 60 minute delay). Layer field 1480 may store information that identifies the map layer with which the particular traffic object is associated. The information, in layer field 1480, may be useful in quickly identifying the map layer with which the particular traffic object is associated.

Figure 15:
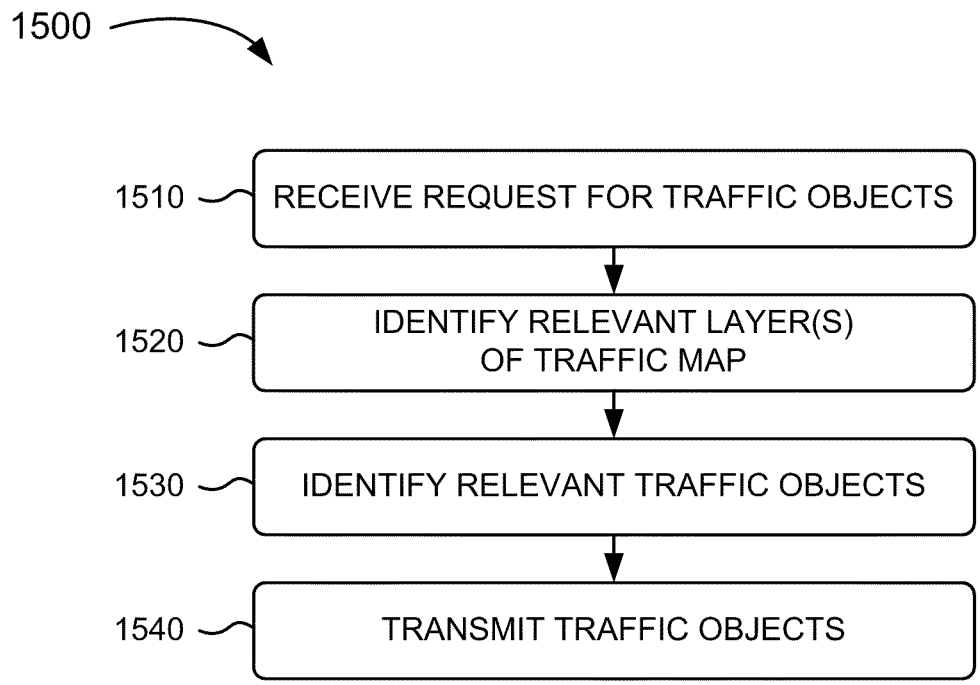
FIG. 15 is a flowchart of an exemplary process for providing traffic objects.

FIG. 15 is a flowchart of an exemplary process 1500 for providing traffic objects. In one implementation, process 1500 may be performed by one or more components of traffic server 230. In another implementation, one or more blocks of process 1500 may be performed by one or more components of another device (e.g., data collector 220), or a group of devices including or excluding traffic server 230.

Process 1500 may include receiving a request for traffic objects (block 1510). For example, a mobile device 120 may send a request to traffic server 230 for traffic objects relating to a path for which mobile device 120 is to calculate navigational directions. Mobile device 120 may make this request when a user, of mobile device 120, enters a new request for navigational directions. Alternatively, or additionally, mobile device 120 may make this request when mobile device 120 recalculates navigational directions for a previously entered request for navigational directions. The request, from mobile device 120, may include a current geographic location of mobile device 120 and a destination geographic location to which navigational directions are to be calculated.

Relevant layer(s) of the traffic map may be identified (block 1520). For example, traffic server 230 may use the information in the request to identify the relevant traffic layer(s). In one implementation, traffic server 230 may identify the travel length using, for example, information regarding the current and destination geographic locations of mobile device 210. Traffic server 230 may classify the travel length as long distance travel, short distance travel, or local travel. Long distance travel may correspond to travel greater than a first threshold (e.g., 50 or 100 kilometers or miles); short distance travel may correspond to travel not greater than the first threshold but greater than a second threshold (e.g., 10 or 15 kilometers or miles); and local travel may correspond to travel not greater than the second threshold.

For long distance travel, traffic server 230 may identify the interstate highway traffic layer (layer 1) covering the entire travel path plus some of the interstate highway traffic layer (layer 1), some of the state highway traffic layer (layer 2), and/or some of the local street traffic layer (layer 3) within several kilometers or miles of the current geographic location of mobile device 210 and/or within several kilometers or miles of the destination geographic location. For short distance travel, traffic server 230 may identify the interstate highway traffic layer (layer 1) and/or the state highway traffic layer (layer 2) covering the entire travel path plus some of the local street traffic layer (layer 3) within several kilometers or miles of the current geographic location of mobile device 210 and/or within several kilometers or miles of the destination geographic location. For local travel, traffic server 230 may identify the interstate highway traffic layer (layer 1), the state highway traffic layer (layer 2), and the local street traffic layer (layer 3) covering the entire travel path.

Relevant traffic objects may be identified (block 1530). As explained above, each of the different layers of the traffic map may be stored as a quad tree. Traffic server 230 may access a quad tree associated with a relevant traffic layer, effectively draw a rectangle covering the area of interest (whether the entire travel path or the several kilometers or miles around the current and/or destination geographic location of mobile device 210), and identify the leaf nodes, of the quad tree, that fall within the area of interest. Traffic server 230 may then identify the traffic objects that are located within the identified leaf nodes.

Figure 16:
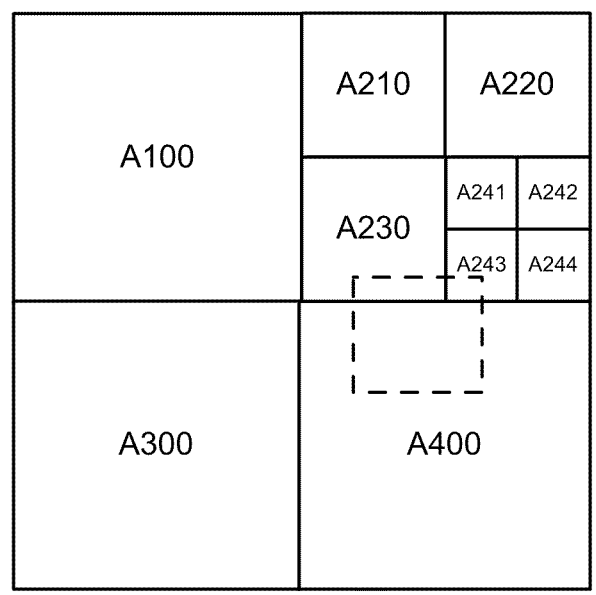
FIG. 16 is a diagram illustrating an exemplary use of a quad tree data structure.

FIG. 16 is a diagram illustrating an exemplary use of a quad tree data structure. As shown in FIG. 16, traffic server 230 may effectively draw a rectangle covering the area of interest. Traffic server 230 may then identify the leaf nodes that fall within the area of interest. As shown in FIG. 16, the rectangle may intersect with leaf nodes A230, A243, and A400. In this example, traffic server 230 may identify the traffic nodes that fall within leaf nodes A230, A243, and A400.

Returning to FIG. 15, the relevant traffic objects may be transmitted (block 1540). For example, traffic server 230 may send the identified traffic objects to mobile device 210. In one implementation, traffic server 230 may send some or all of the information that is stored for the traffic objects, such as some or all of the information described above with regard to FIG. 14. Mobile device 210 may use the information regarding the traffic objects to perform a shortest path calculation to the destination geographic location.

Figure 17:
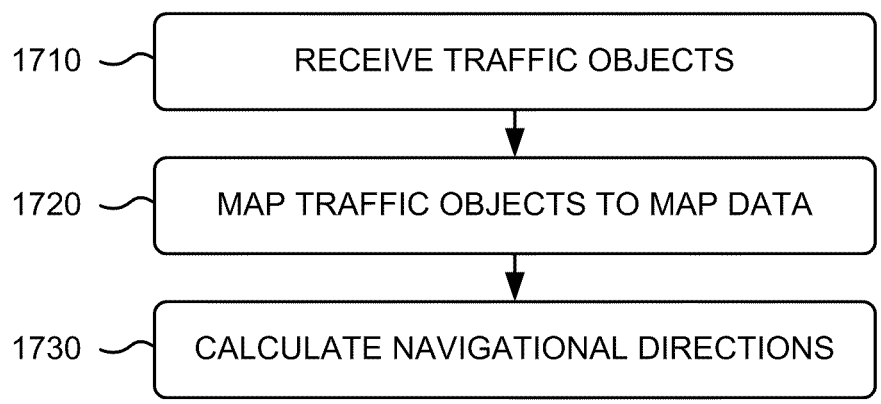
FIG. 17 is a flowchart of an exemplary process for calculating navigational directions.

FIG. 17 is a flowchart of an exemplary process 1700 for calculating navigational directions. In one implementation, process 1700 may be performed by one or more components of mobile device 210. In another implementation, one or more blocks of process 1700 may be performed by one or more components of another device (e.g., data collector 220 and/or traffic server 230), or a group of devices including or excluding mobile device 210.

Process 1700 may include receiving traffic objects (block 1710). For example, as described above, mobile device 210 may request traffic objects from traffic server 230, and traffic server 230 may identify relevant traffic objects and transmit information associated with these traffic objects to mobile device 210.

The traffic objects may be mapped to the map data (block 1720). Mobile device 210 may store its own map data of the road network. Due to various reasons, such as the source data, the information, received from traffic server 230 for the traffic objects, may be different from the map data of the road network of mobile device 210. Thus, mobile device 210 may map the traffic objects to the map data of the road network. One technique that mobile device 210 may use to map from a traffic object to a road network node/link is through matching of the geographic location information (e.g., longitude and latitude coordinates) using a geographic information system (GIS) data structure and operation, such as a quad tree method described above. Once mobile device 210 performs this mapping for the first time, mobile device 210 may generate a table that includes the mapping information. Thus, later mapping operations, performed by mobile device 210, may include a simple table lookup.

In another implementation, mobile device 210 may use the information received from traffic server 230 to identify the appropriate nodes and/or links in the road network. For example, mobile device 210 may use information in list of nodes field 1450 and/or list of links field 1460 to identify the appropriate nodes and/or links in the road network.

Navigational directions may be calculated (block 1730). In one implementation, mobile device 210 may store data structures similar to the data structures described above with regard to FIGS. 11 and 12. In other words, mobile device 210 may store information regarding nodes and links in the road network, including, for example, information regarding the traveling speed on various links. Mobile device 210 may update the traveling speed information based on the congestion factor associated with the traffic objects. Mobile device 210 may then calculate navigational directions based on its updated information.

In one implementation, mobile device 210 may calculate the navigational directions using a shortest path label correcting or label setting algorithm. The shortest path problem, as used to compute paths in networks, can be used as a basis for calculating navigational directions. Let G=(N,A) be a finite directed graph with node set N and arc (link) set A. The nodes and links are connected and represented using an adjacency data structure, such as a linked list.

Each node, in the linked list, may point to the first link out of this node. Each subsequent link may point to the next link out of this node until reaching the last link out of this node. That last link may point to NULL. Each link may also point to the other end node of the link and the corresponding link of "other" since each link is directional and a street is usually two ways. In the case that the street is one way, either the "other" is NULL or the traveling speed is zero (i.e., the cost (traveling time) of the link is infinity).

Let each arc (u,v) in A have assigned to it a positive real number d(u,v) called the cost or distance of arc (u,v). Usually the shortest path is based on distance, but, in this case, the shortest path is based on traveling time. Thus, d(u,v) will be the traveling time along arc (u,v) from node u to node v. Therefore, the shortest path in a navigation system may correspond to the shortest traveling time from a source node to a destination node in the road network.

There are many shortest path algorithms that can be used. The shortest path algorithm is described generally in Wikipedia (see, e.g., http://en.wikipedia.org/wiki/Shortest_path_problem). A label setting algorithm, described as the Dijkstra's algorithm, may be used (see, e.g., http://en.wikipedia.org/wiki/Dijkstra %27s_algorithm). Alternatively, a label correcting algorithm, described as the Bellman-Ford algorithm, may be used (see, e.g., http://en.wikipedia.org/wiki/Bellman-Ford_algorithm).

Generally, the shortest path algorithm may maintain a solution and try to find a better solution until no better solution can be found, then the solution is called the optimal solution. Let L(i) be the traveling speed (or label) from root node r (corresponding to the current geographic location of mobile device 210) to node i along the best available path found so far. All nodes, but root node r, may be labeled as L(i)=infinity, for all i in N (i.e., the graph nodes set). Root node r may be labeled as L(r)=0. Root node r may be placed into a list called Q. While the list Q is not empty, the following steps may be repeated:

Take a node (e.g., node i) from the list Q and scan all its adjacent arcs (links out of node i) of node i, set L(j)=min{L(j), (L(i)+d(i,j)) for all nodes j adjacent to node i. This may basically determine if the path from r to i going through node j is better. If the label L(j) of node j is improved, then put node j into the list Q.

When the list Q is empty, then the algorithm has a shortest path tree from root node r to all other nodes in the network including the destination node t.

Figure 18:
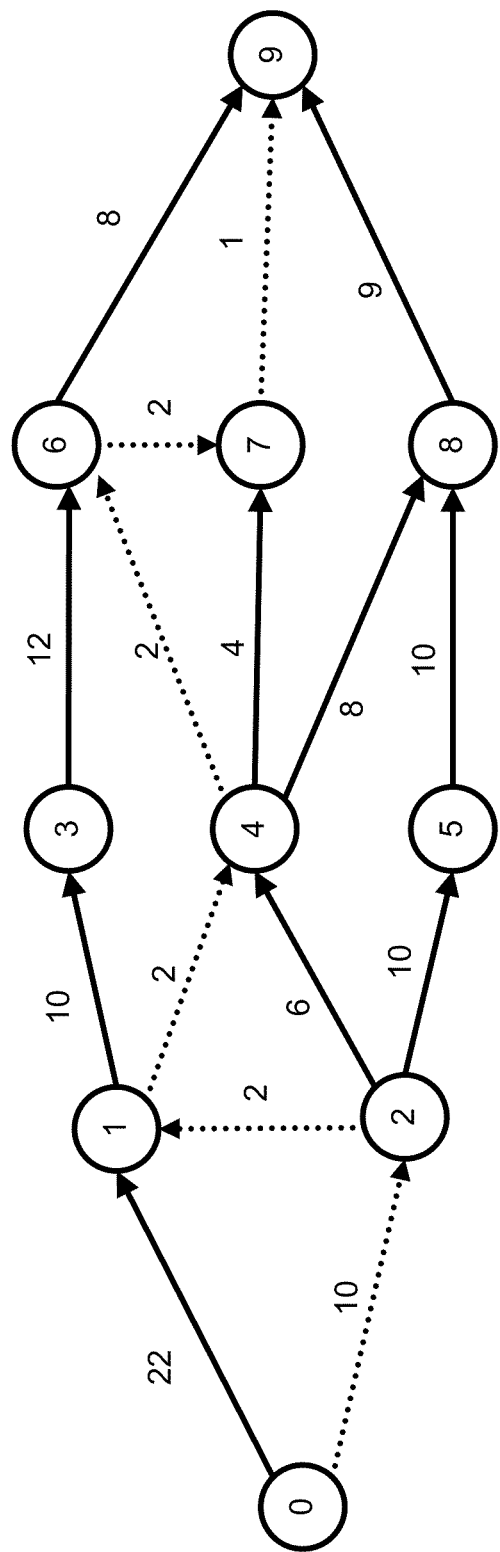
FIG. 18 is a diagram illustrating an exemplary shortest path calculation.

Mobile device 210 may generate navigational directions corresponding to the calculated shortest path. FIG. 18 is a diagram illustrating an exemplary shortest path calculation. As shown in FIG. 18, assume that the root node is labeled as node 0 and the destination node is labeled as node 9. The cost of taking each of the links may be calculated based, for example, on the congestion factor, as explained above. The cost of taking a link is shown, in FIG. 18, as the number next to the link. Thus, the shortest path calculation may determine that the shortest path from root node 0 to destination node 9 may traverse node 2 to node 1 to node 4 to node 6 to node 7 to node 9.

There are a few ways to generate revenue from providing navigational directions based on real-time traffic information. One way to generate revenue may be to charge users a subscription fee. For example, a provider, of the real-time traffic information, may charge users a subscription fee to be able to avoid traffic congestion.

Another way to generate revenue may be to sell advertisements. For example, a provider, of the real-time traffic information, may permit advertisers to purchase traffic objects and have an advertisement presented when mobile device 210 is within a particular distance of that traffic object. In this case, when traffic server 230 provides a particular traffic object to a mobile device 210, traffic server 230 may provide an advertisement to present on mobile device 210 when mobile device 210 is within a certain distance of the traffic object. In another implementation, the provider, of the real-time traffic information, may permit advertisers to purchase leaf nodes of the quad tree. In this case, when traffic server 230 provides a traffic object, of a leaf node, to a mobile device 210, traffic server 230 may provide an advertisement to present on mobile device 210 when mobile device 210 is within a geographic area covered by the leaf node. In yet another implementation, the provider, of the real-time traffic information, may permit advertisers to purchase particular geographic locations (e.g., nodes, links, longitude and latitude coordinates, etc.). In this case, when traffic server 230 provides a particular traffic object, associated with the particular geographic location, to a mobile device 210, traffic server 230 may provide an advertisement to present on mobile device 210 when mobile device 210 is within a certain distance of the particular geographic location.

Figure 19:
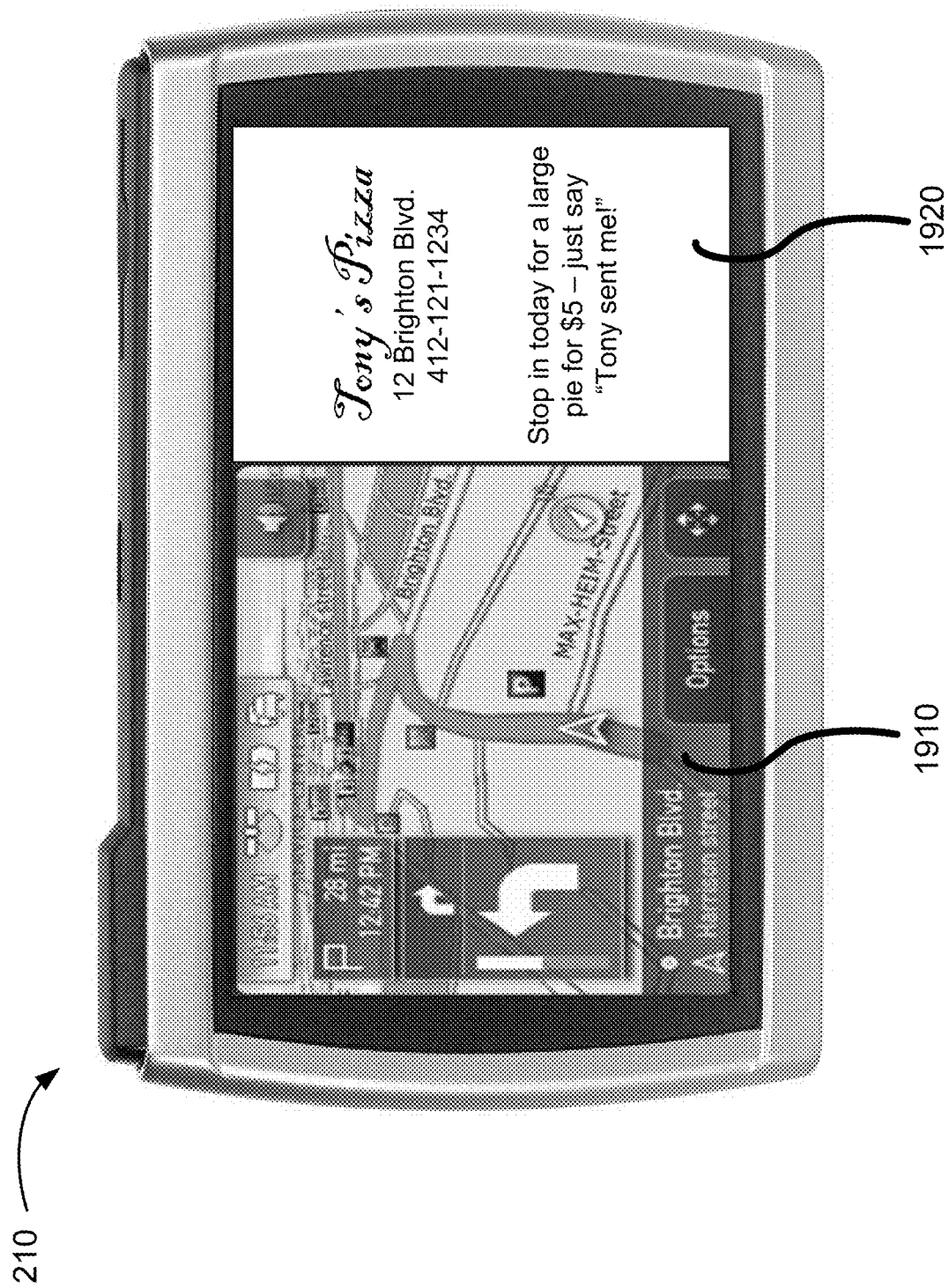
FIG. 19 is a diagram illustrating an exemplary presentation of an advertisement in connection with navigational directions.

FIG. 19 is a diagram illustrating an exemplary presentation of an advertisement in connection with navigational directions. As shown in FIG. 19, a mobile device 210 may include a navigation section 1910 and an advertisement section 1920. Navigation section 1910 may provide navigational directions to a user of mobile device 210. Advertisement section 1920 may provide an advertisement of an advertiser that has purchased the opportunity to present an advertisement in connection with a particular traffic object or a particular geographic location.

In one implementation, mobile device 210 may normally contain only navigation section 1910. In the situation where the geographic location of mobile device 210 is within a certain distance of a particular traffic object or a particular geographic location, for which an advertiser has paid to have an advertisement presented, mobile device 210 may partition the screen of mobile device 210 to include both navigation section 1910 and advertisement section 1920. In this case, mobile device 210 may present an advertisement, associated with the advertiser, in advertisement section 1920. The advertisement, presented in advertisement section 1920, may include text, video, audio, or some combination of text, video, and/or audio.

Implementations, described herein, may present information regarding traffic objects associated with a travel path for which a user desires navigational directions. A mobile device, used by the user, may use the traffic objects information to calculate a shortest path for the navigational directions. As a result, the user may avoid areas of traffic congestion.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6, 13, 15, and 17, the order of the blocks may be modified in other implementations. Further, non-dependent blocks may be performed in parallel.

Also, the term "logic," as used herein, may refer to hardware, or a combination of hardware and software.

Further, reference has been made to states, such as interstate highways and state highways. The term "state," as used herein, is intended to refer to a region with borders. In some implementations, the term "state" may correspond to a country, a county, or some other bounded region.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, the method comprising:
   collecting, by the one or more server devices, geographic location and traveling speed data from a plurality of mobile devices;
   identifying, by the one or more server devices, areas of traffic congestion based on the geographic location and the traveling speed data;
   generating, by the one or more server devices, a plurality of traffic objects associated with the areas of traffic congestion;
   receiving, at the one or more server devices and from a particular mobile device, a request for traffic objects,
      the request including a current geographic location of the particular mobile device and a destination geographic location to which the particular mobile device is to travel;
   determining, by the one or more server devices, a length of travel identifying a length of a path from the current geographic location to the destination geographic location;
   determining, by the one or more server devices, whether the length of travel satisfies at least one of a first threshold or a second threshold;
   selectively identifying, by the one or more server devices and based on determining whether the length of travel satisfies at least one of the first threshold or the second threshold, portions of a plurality of map layers,
      each of the plurality of map layers being associated with a type of roadway,
      each of the plurality of map layers being stored as a quad tree representation,
      the plurality of map layers including an interstate highway traffic layer, a state highway traffic layer, and a local streets traffic layer,
      when the length of travel satisfies the first threshold, the selectively identified portions of the plurality of map layers including:
         a portion of the interstate highway traffic layer covering an entirety of the path from the current geographic location to the destination geographic location;
         a first portion of the state highway traffic layer within a particular distance of the current geographic location;
         a second portion of the state highway traffic layer within the particular distance of the destination geographic location;
         a first portion of the local streets traffic layer within the particular distance of the current geographic location; and
         a second portion of the local streets traffic layer within the particular distance of the destination geographic location,
      when the length of travel satisfies the second threshold and does not satisfy the first threshold, the selectively identified portions of the plurality of map layers including:
         the portion of the interstate highway traffic layer covering the entirety of the path from the current geographic location to the destination geographic location;
         a third portion of the state highway traffic layer covering the entirety of the path from the current geographic location to the destination geographic location;
         the first portion of the local streets traffic layer within the particular distance of the current geographic location; and
         the second portion of the local streets traffic layer within the particular distance of the destination geographic location, and
      when the length of travel does not satisfy the first threshold and the second threshold, the selectively identified portions of the plurality of map layers including:
         the portion of the interstate highway traffic layer covering the entirety of the path from the current geographic location to the destination geographic location;
         the third portion of the state highway traffic layer covering the entirety of the path from the current geographic location to the destination geographic location; and
         a third portion of the local streets traffic layer covering the entirety of the path from the current geographic location to the destination geographic location;
   accessing, by the one or more server devices and based on the request, a plurality of quad tree representations corresponding to the plurality of map layers,
      a first quad tree representation, of the plurality of quad tree representations, corresponding to the interstate highway traffic layer,
      a second quad tree representation, of the plurality of quad tree representations, corresponding to the state highway traffic layer,
      a third quad tree representation, of the plurality of quad tree representations, corresponding to the local streets traffic layer, and
      each of the plurality of quad tree representations comprising:
         a root representing a geographic region, and
         leaf nodes representing quadrants of the geographic region, each leaf node, of the leaf nodes, representing a corresponding quadrant of the quadrants;

identifying, by the one or more server devices and based on accessing the plurality of quad tree representations, areas of interest corresponding to the selectively identified portions of the plurality of map layers;

identifying, by the one or more server devices, a subset of the leaf nodes within the areas of interest corresponding to the selectively identified portions of the plurality of map layers;

identifying, by the one or more server devices, one or more particular traffic objects, of the plurality of traffic objects, located within the subset of the leaf nodes, the one or more particular traffic objects including one or more of:
   a node object,
   a link object,
   a box object, or
   a turn object; and providing, by the one or more server devices, information regarding the one or more particular traffic objects to the particular mobile device to permit the particular mobile device to generate navigational directions based on the one or more particular traffic objects,
   a graphical interface of the particular mobile device being partitioned to include a navigation section and an advertisement section,
      the navigational directions being provided for display in the navigation section.

2. The method of claim 1, further comprising:
identifying additional areas of traffic congestion based on historical information regarding previously identified areas of traffic congestion; and
where generating the plurality of traffic objects comprises:
   generating traffic objects associated with the identified areas of traffic congestion and the additional areas of traffic congestion.

3. The method of claim 1, further comprising:
associating the plurality of traffic objects with the plurality of map layers;
creating a tree data structure for the plurality of map layers; and
storing information regarding one of the plurality of traffic objects in association with the tree data structure.

4. The method of claim 1, where identifying the one or more particular traffic objects includes:
identifying a portion of a particular quad tree representation, of the plurality of quad tree representations, associated with the current geographic location or the destination geographic location, and
searching the portion of the particular quad tree representation to identify the one or more particular traffic objects.

5. The method of claim 1, further comprising:
storing information for the one or more particular traffic objects,
   the stored information including at least one of:
      an identifier that uniquely identifies a particular traffic object of the one or more particular traffic objects,
      a type identifier that identifies a type of the particular traffic object,
      a location identifier that identifies a geographic location of the particular traffic object,
      a description that describes traffic congestion associated with the particular traffic object, or
      a congestion factor that identifies an amount of congestion associated with the particular traffic object; and
where providing the information regarding the one or more particular traffic objects comprises:
   transmitting the stored information to the particular mobile device.

6. The method of claim 1, further comprising:
associating an advertisement with the one or more particular traffic objects; and
where providing the information regarding the one or more particular traffic objects comprises:
   transmitting the advertisement to the particular mobile device along with the information regarding the one or more particular traffic objects.

7. The method of claim 1, further comprising:
instructing the plurality of mobile devices on when to provide the geographic location and the traveling speed data for collection.

8. The method of claim 1, where collecting the geographic location and the traveling speed data from the plurality of mobile devices includes:
collecting the geographic location and the traveling speed data from the plurality of mobile devices in real-time.

9. One or more server devices, comprising:
means for identifying areas of traffic congestion;
means for generating a plurality of traffic objects associated with the identified areas of traffic congestion;
means for receiving, from a particular mobile device, a request for traffic objects,
   the request including a current geographic location of the particular mobile device and a destination geographic location to which the particular mobile device is to travel;
means for determining a length of travel identifying a length of a path from the current geographic location to the destination geographic location;
means for determining whether the length of travel satisfies at least one of a first threshold or a second threshold;
means for selectively identifying, based on determining whether the length of travel satisfies at least one of the first threshold or the second threshold, portions of a plurality of map layers,
   each of the plurality of map layers being associated with a type of roadway,
   each of the plurality of map layers being stored as a quad tree representation,
   the plurality of map layers including an interstate highway traffic layer, a state highway traffic layer, and a local streets traffic layer,
   when the length of travel satisfies the first threshold, the selectively identified portions of the plurality of map layers including:
      a portion of the interstate highway traffic layer covering an entirety of the path from the current geographic location to the destination geographic location;
      a first portion of the state highway traffic layer within a particular distance of the current geographic location;
      a second portion of the state highway traffic layer within the particular distance of the destination geographic location;
      a first portion of the local streets traffic layer within the particular distance of the current geographic location; and a second portion of the local streets traffic layer within the particular distance of the destination geographic location,
when the length of travel satisfies the second threshold and does not satisfy the first threshold, the selectively identified portions of the plurality of map layers including:
the portion of the interstate highway traffic layer covering the entirety of the path from the current geographic location to the destination geographic location;
a third portion of the state highway traffic layer covering the entirety of the path from the current geographic location to the destination geographic location;
the first portion of the local streets traffic layer within the particular distance of the current geographic location; and
the second portion of the local streets traffic layer within the particular distance of the destination geographic location, and
when the length of travel does not satisfy the first threshold and the second threshold, the selectively identified portions of the plurality of map layers including:
the portion of the interstate highway traffic layer covering the entirety of the path from the current geographic location to the destination geographic location,
the third portion of the state highway traffic layer covering the entirety of the path from the current geographic location to the destination geographic location; and
a third portion of the local streets traffic layer covering the entirety of the path from the current geographic location to the destination geographic location;
means for accessing, based on the request, a plurality of quad tree representations corresponding to the plurality of map layers,
a first quad tree representation, of the plurality of quad tree representations, corresponding to the interstate highway traffic layer,
a second quad tree representation, of the plurality of quad tree representations, corresponding to the state highway traffic layer,
a third quad tree representation, of the plurality of quad tree representations, corresponding to the local streets traffic layer, and
each of the plurality of quad tree representations comprising:
a root representing a geographic region, and
leaf nodes representing quadrants of the geographic region,
each leaf node, of the leaf nodes, representing a corresponding quadrant of the quadrants;
means for identifying, based on accessing the plurality of quad tree representations, areas of interest corresponding to the selectively identified portions of the plurality of map layers;
means for identifying a subset of the leaf nodes within the areas of interest corresponding to the selectively identified portions of the plurality of map layers;
means for identifying one or more particular traffic objects, of the plurality of traffic objects, located within the leaf nodes,
the one or more particular traffic objects including one or more of:
a node object,
a link object,
a box object, or
a turn object; and
means for providing information regarding the one or more particular traffic objects to the particular mobile device to permit the particular mobile device to generate navigational directions based on the one or more particular traffic objects,
a graphical interface of the particular mobile device being partitioned to include a navigation section and an advertisement section,
the navigational directions being provided for display in the navigation section.

10. The one or more server devices of claim 9, further comprising:
means for associating the plurality of traffic objects with the plurality of map layers;
means for creating a tree data structure for the plurality of map layers; and
means for storing information regarding one of the plurality of traffic objects in association with the tree data structure; and
where the means for identifying the one or more particular traffic objects includes:
means for identifying a portion of the tree data structure associated with the current geographic location or the destination geographic location, and
means for searching the portion of the tree data structure to identify the one or more particular traffic objects.

11. The one or more server devices of claim 9, further comprising:
means for collecting geographic location and traveling speed data from a plurality of mobile devices; and
where means for identifying the areas of traffic congestion comprises:
means for identifying the areas of traffic congestion based on the geographic location and the traveling speed data from the plurality of mobile devices.

12. One or more server devices, comprising:
one or more memory devices; and
one or more processor devices, connected to the one or more memory devices, to:
identify areas of traffic congestion,
generate a plurality of traffic objects associated with the areas of traffic congestion,
associate, in the one or more memory devices, each of the plurality of traffic objects with one or more of a plurality of map layers,
the plurality of map layers including an interstate highway traffic layer, a state highway traffic layer, and a local streets traffic layer, receive, from a particular mobile device, a request for traffic objects,
the request including a current geographic location of the particular mobile device and a destination geographic location to which the particular mobile device is to travel,
determine a length of travel identifying a length of a path from the current geographic location to the destination geographic location,
determine whether the length of travel satisfies at least one of a first threshold or a second threshold;

select, based on determining whether the length of travel satisfies at least one of the first threshold or the second threshold, portions of the plurality of map layers,
  each of the plurality of map layers being associate with a type of roadway,
  each of the plurality of map layers being stored as a quad tree representation,
  when the length of travel satisfies the first threshold, the selected portions of the plurality of map layers including:
    a portion of the interstate highway traffic layer covering an entirety of the path from the current geographic location to the destination geographic location;
    a first portion of the state highway traffic layer within a particular distance of the current geographic location;
    a second portion of the state highway traffic layer within the particular distance of the destination geographic location;
    a first portion of the local streets traffic layer within the particular distance of the current geographic location; and
    a second portion of the local streets traffic layer within the particular distance of the destination geographic location,
  when the length of travel satisfies the second threshold and does not satisfy the first threshold, the selected portions of the plurality of map layers including:
    the portion of the interstate highway traffic layer covering the entirety of the path from the current geographic location to the destination geographic location;
    a third portion of the state highway traffic layer covering the entirety of the path from the current geographic location to the destination geographic location;
    the first portion of the local streets traffic layer within the particular distance of the current geographic location;
    the second portion of the local streets traffic layer within the particular distance of the destination geographic location, and
  when the length of travel does not satisfy the first threshold and the second threshold, the selected portions of the plurality of map layers including:
    the portion of the interstate highway traffic layer covering the entirety of the path from the current geographic location to the destination geographic location,
    the third portion of the state highway traffic layer covering the entirety of the path from the current geographic location to the destination geographic location, and
    a third portion of the local streets traffic layer covering the entirety of the path from the current geographic location to the destination geographic location;
access, based on the request, a plurality of quad tree representations corresponding to the plurality of map layers,
  a first quad tree representation, of the plurality of quad tree representations, corresponding to the interstate highway traffic layer,
  a second quad tree representation, of the plurality of quad tree representations, corresponding to the state highway traffic layer,
  a third quad tree representation, of the plurality of quad tree representations, corresponding to the local streets traffic layer, and
  each of the plurality of quad tree representations comprising:
    a root representing a geographic region, and
    leaf nodes representing quadrants of the geographic region,
      each leaf node, of the leaf nodes, representing a corresponding quadrant of the quadrants,
identify, based on accessing the plurality of quad tree representations, areas of interest corresponding to the selected portions of the plurality of map layers;
identify a subset of the leaf nodes within the areas of interest corresponding to the selected portions of the plurality of map layers;
identify one or more traffic objects, of the plurality of traffic objects, located within the leaf nodes,
  the one or more traffic objects including one or more of:
    a node object,
    a link object,
    a box object, or
    a turn object; and
present information regarding the one or more traffic objects to the particular mobile device to permit the particular mobile device to generate navigational directions based on the one or more traffic objects,
  a graphical interface of the particular mobile device being partitioned to include a navigation section and an advertisement section,
    the navigational directions being provided for display in the navigation section.

13. The one or more server devices of claim 12, where:
the node object is identified by a particular geographic location;
the link object is identified by two geographic locations that define two endpoints of the link object;
a block object is identified by two geographic locations that define a lower-left corner and an upper-right corner of the box object; or
the turn object is identified by three geographic locations that define a beginning point, a turning point, and an ending point of the turn object.

14. The one or more server devices of claim 12, where, when identifying the areas of traffic congestion, the one or more processor devices are to:
identify the areas of traffic congestion based on historical information regarding previously identified areas of traffic congestion; and
where, when generating the plurality of traffic objects, the one or more processor devices are to:
generate traffic objects associated with the identified areas of traffic congestion.

15. The one or more server devices of claim 12, where the one or more processor devices are further to:
collect geographic location and traveling speed data from a plurality of mobile devices,
where, when identifying the areas of traffic congestion, the one or more processor devices are to:
identify the areas of traffic congestion based on the collected geographic location and traveling speed data; and where, when generating the plurality of traffic objects, the one or more processor devices are to:
  generate traffic objects associated with the identified areas of traffic congestion.

16. The one or more server devices of claim 12, where the one or more processor devices are further to:
  create a particular quad tree representation for the selected portions of the plurality of map layers, and
  store, in the one or more memory devices, information regarding one of the plurality of traffic objects in association with the particular quad tree representation.

17. The one or more server devices of claim 12, where the one or more processor devices are further to:
  identify a portion of a particular quad tree representation, of the plurality of quad tree representations, associated with the current geographic location or the destination geographic location, and
  search the portion of the particular quad tree representation to identify the one or more traffic objects; and
  where, when identifying the one or more traffic objects, the one or more processor devices are to:
    identify the one or more traffic objects based on searching the portion of the particular quad tree representation.

18. The one or more server devices of claim 17, where the one or more processor devices are further to:
  associate an advertisement with the portion of the particular quad tree representation,
  where, when presenting the information regarding the one or more traffic objects, the one or more processor devices are to:
    transmit the advertisement to the particular mobile device along with the information regarding the one or more traffic objects.

19. The one or more server devices of claim 12, where the one or more processor devices are further to:
  associate an advertisement with a particular traffic object of the one or more traffic objects,
  where, when presenting the information regarding the one or more traffic objects, the one or more processor devices are to:
    transmit the advertisement to the particular mobile device along with the information regarding the one or more traffic objects.

20. The one or more server devices of claim 12, where the one or more processor devices are further to:
  collect geographic location and traveling speed data from a plurality of mobile devices in real-time; and
  where the one or more processor devices, when identifying the areas of traffic congestion, are to:
    identify the areas of traffic congestion based on collecting the geographic location and the traveling speed data from the plurality of mobile devices in real-time.

21. A mobile device, comprising:
  a display; and
  a processor to:
    receive, from a user, first information regarding a destination geographic location to which the user desires navigational directions,
    send a request for traffic objects to a server,
      the request including a current geographic location of the mobile device and the destination geographic location,
    receive second information including traffic congestion data and one or more traffic objects from the server,
      the one or more traffic objects being located within one or more leaf nodes,
        each leaf node, of the one or more leaf nodes, representing a corresponding quadrant of a geographic region,
        the geographic region being represented by a root of a particular quad tree representation of a plurality of quad tree representations,
        the one or more leaf nodes being within areas of interest corresponding to portions of a plurality of map layers to be selectively identified,
        the plurality of map layers including an interstate highway traffic layer, a state highway traffic layer, and a local streets traffic layer,
        the interstate highway traffic layer being stored as a first quad tree representation of the plurality of quad tree representations,
        the state highway traffic layer being stored as a second quad tree representation of the plurality of quad tree representations, and
        the local streets traffic layer being stored as a third quad tree representation of the plurality of quad tree representations,
      the one or more traffic objects being based on:
        the current geographic location,
        the destination geographic location,
        a length of travel identifying a length of a path between the current geographic location and the destination geographic location,
          the length of travel being used to selectively identify the portions of the plurality of map layers,
          when the length of travel satisfies a first threshold, the portions of the plurality of map layers being selectively identified including:
            a portion of the interstate highway traffic layer covering an entirety of the path between the current geographic location and the destination geographic location;
            a first portion of the state highway traffic layer within a particular distance of the current geographic location;
            a second portion of the state highway traffic layer within the particular distance of the destination geographic location;
            a first portion of the local streets traffic layer within the particular distance of the current geographic location; and
            a second portion of the local streets traffic layer within the particular distance of the destination geographic location,
          when the length of travel satisfies a second threshold and does not satisfy the first threshold, the portions of the plurality of map layers being selectively identified including:
            the portion of the interstate highway traffic layer covering the entirety of the path between the current geographic location and the destination geographic location;
            a third portion of the state highway traffic layer covering the entirety of the path between the current geographic location and the destination geographic location;
            the first portion of the local streets traffic layer within the particular distance of the current geographic location; and the second portion of the local streets traffic layer within the particular distance of the destination geographic location, and when the length of travel does not satisfy the first threshold and the second threshold, the portions of the plurality of map layers being selectively identified including:

the portion of the interstate highway traffic layer covering the entirety of the path between the current geographic location and the destination geographic location;

the third portion of the state highway traffic layer covering the entirety of the path between the current geographic location and the destination geographic location; and a third portion of the local streets traffic layer covering the entirety of the path between the current geographic location and the destination geographic location, and the one or more traffic objects including one or more of:
a node object,
a link object,
a box object, or
a turn object, map the one or more traffic objects to map data,
generate the navigational directions based on mapping the one or more traffic objects to the map data, and
provide, for presentation, the navigational directions on the display,
a graphical interface of the display being partitioned to include a navigation section and an advertisement section,
the navigational directions being provided for presentation in the navigation section.

22. The mobile device of claim 21, where the particular distance is a first particular distance; and
where the processor is further to:
receive, from the server, an advertisement associated with a traffic object of the one or more traffic objects,
determine whether the current geographic location of the mobile device is within a second particular distance of a geographic location associated with the traffic object, and
provide, for display, the advertisement when the current geographic location of the mobile device is within the second particular distance of the geographic location associated with the traffic object.

23. The mobile device of claim 21, further comprising:
a memory to store information regarding nodes and links of a road network; and
where the processor, when mapping the one or more traffic objects to the map data, is to:
map the one or more traffic objects to one of the nodes or one of the links of the road network.

* * * * *